(12) United States Patent
Gobinath et al.

(10) Patent No.: US 9,045,005 B2
(45) Date of Patent: Jun. 2, 2015

(54) AIR MAINTENANCE PUMPING ASSEMBLY AND TIRE

(71) Applicant: The Goodyear Tire & Rubber Company, Akron, OH (US)

(72) Inventors: Thulasiram Gobinath, Hudson, OH (US); Carolin Anna Welter, Schleich (DE); Cheng-Hsiung Lin, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 266 days.

(21) Appl. No.: 13/750,123

(22) Filed: Jan. 25, 2013

(65) Prior Publication Data

US 2014/0158267 A1 Jun. 12, 2014

Related U.S. Application Data

(60) Provisional application No. 61/734,016, filed on Dec. 6, 2012.

(51) Int. Cl.
*B60C 19/00* (2006.01)
*B60C 23/12* (2006.01)

(52) U.S. Cl.
CPC ......... *B60C 19/00* (2013.01); *Y10T 152/10495* (2015.01); *B60C 23/12* (2013.01)

(58) Field of Classification Search
CPC ............................... B60C 19/00; B60C 23/12
See application file for complete search history.

(56) References Cited

U.S. PATENT DOCUMENTS

| 1,050,886 A | 1/1913 | Wetherell |
| 1,134,361 A | 4/1915 | Wetherell |

(Continued)

FOREIGN PATENT DOCUMENTS

| DE | 3433318 A1 | 3/1986 |
| EP | 2610088 A1 | 7/2013 |

(Continued)

OTHER PUBLICATIONS

EPO Search Report dated Mar. 31, 2014.

*Primary Examiner* — Justin Fischer
(74) *Attorney, Agent, or Firm* — Robert N. Lipcsik

(57) ABSTRACT

A tire assembly includes a tire having a pneumatic cavity, first and second sidewalls, a sidewall groove, an air passageway, and a pressure regulator mounted to an inner surface of the pneumatic tire cavity. The pressure regulator controls air pressure within the pneumatic tire cavity. The first and second sidewalls extend respectively from first and second tire bead regions to a tire tread region. The first sidewall has at least one bending region operatively bending when circumferentially within a rolling tire footprint. The sidewall groove defining groove sidewalls positioned within the bending region of the first tire sidewall. The groove and air passageway deform segment by segment between a non-deformed state and a deformed, constricted state in response to the bending of the first sidewall bending region circumferentially within the rolling tire footprint.

17 Claims, 31 Drawing Sheets

(56) References Cited

U.S. PATENT DOCUMENTS

| | | |
|---|---|---|
| 3,304,981 A | 2/1967 | Leslie |
| 3,833,041 A | 9/1974 | Glad |
| 3,867,973 A | 2/1975 | Cozzolino et al. |
| 4,922,984 A | 5/1990 | Dosjoub et al. |
| 5,052,456 A | 10/1991 | Dosjoub |
| 7,117,731 B2 | 10/2006 | Hrabal |
| 7,225,845 B2 | 6/2007 | Ellmann |
| 8,042,586 B2 | 10/2011 | Losey et al. |
| 2009/0294006 A1 | 12/2009 | Hrabal |
| 2011/0272073 A1 | 11/2011 | Losey |
| 2012/0125524 A1 | 5/2012 | Delgado et al. |

FOREIGN PATENT DOCUMENTS

| | | |
|---|---|---|
| RU | 2106978 C1 | 3/1998 |
| WO | WO03049958 A1 | 6/2003 |
| WO | WO2005012009 A1 | 2/2005 |
| WO | WO2007134556 A1 | 11/2007 |
| WO | WO2010008338 A1 | 1/2010 |

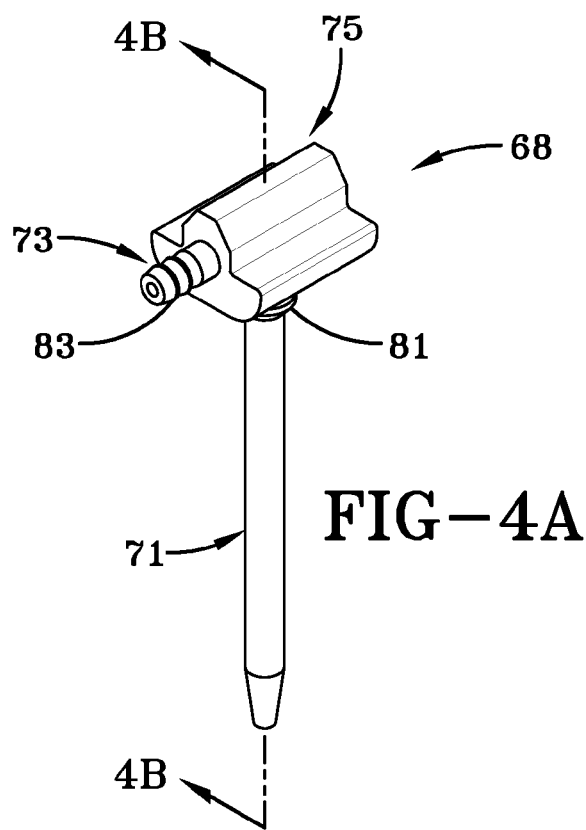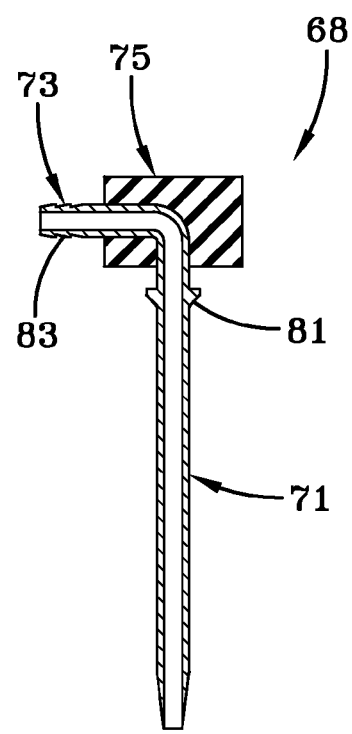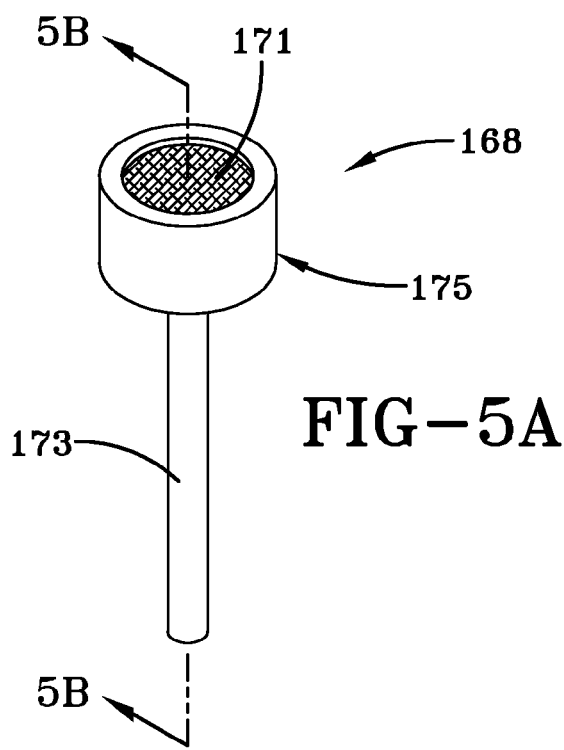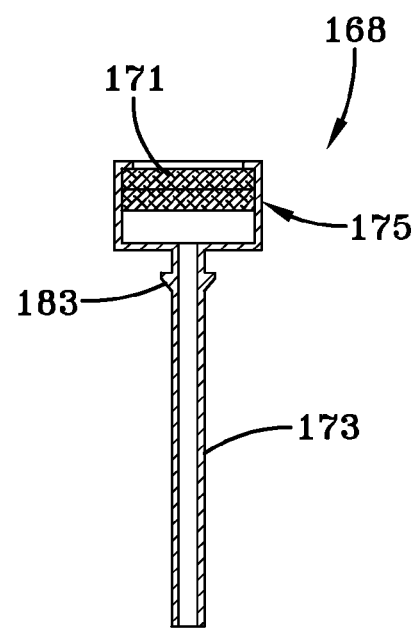
FIG-4A
FIG-4B
FIG-5A
FIG-5B

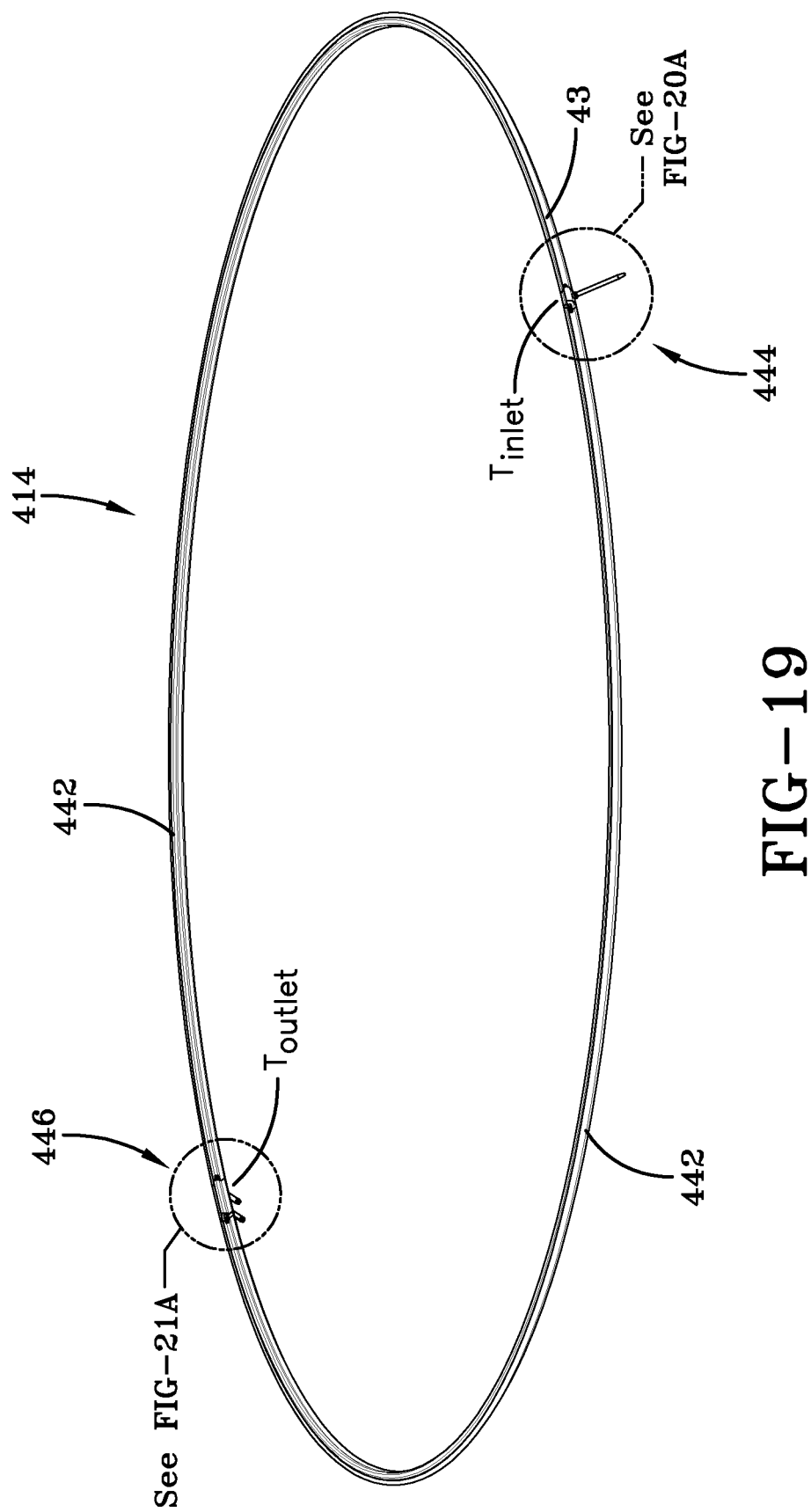

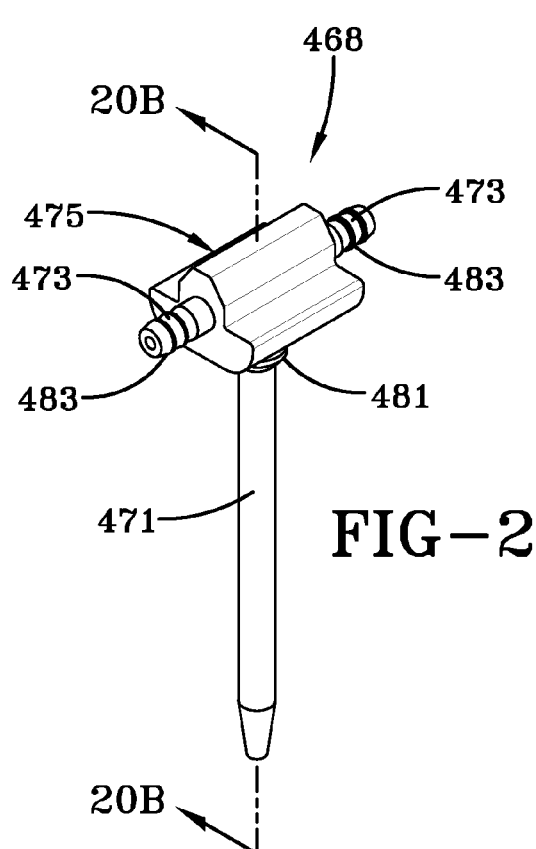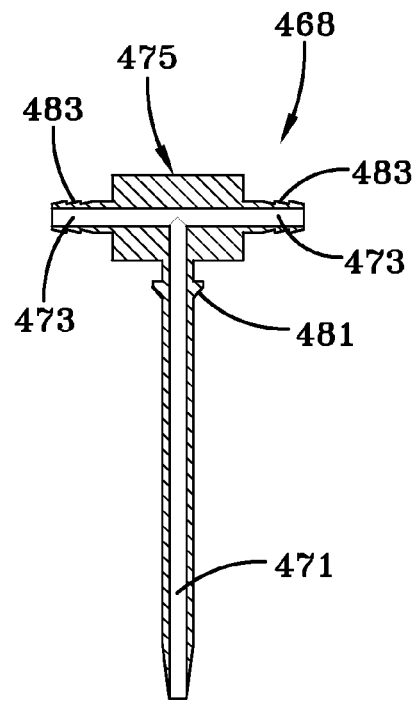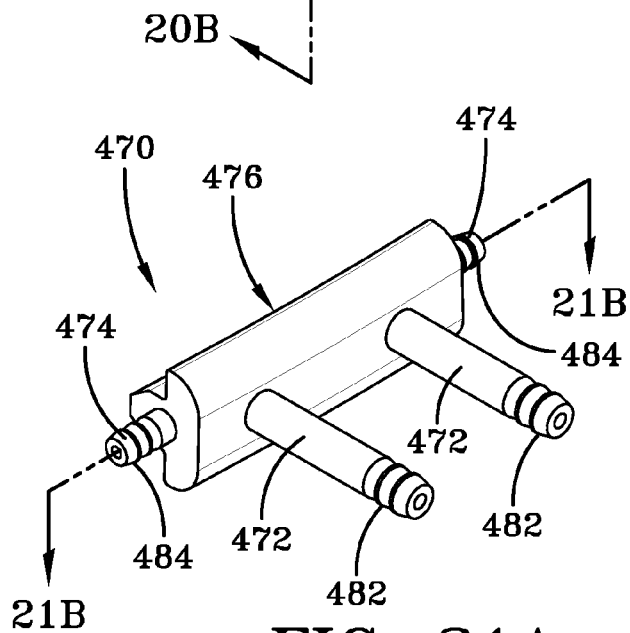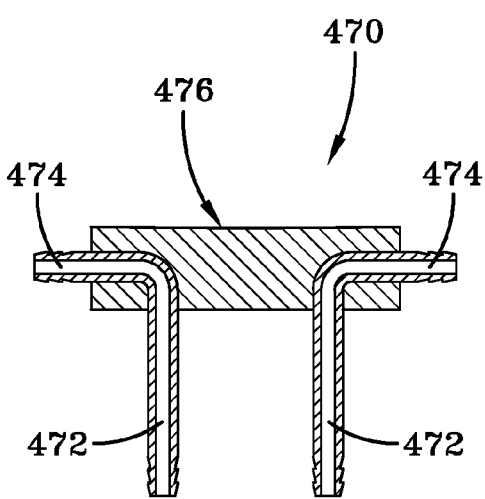

AIR MAINTENANCE PUMPING ASSEMBLY AND TIRE

FIELD OF THE INVENTION

The invention relates generally to air maintenance tires and, more specifically, to an air maintenance and tire pumping assembly.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependent upon the driver taking remedial action when warned to re-inflate a tire to recommended pressure. It is a desirable, therefore, to incorporate an air maintenance feature within a tire that will maintain air pressure within the tire in order to compensate for any reduction in tire pressure over time without the need for driver intervention.

SUMMARY OF THE INVENTION

A tire assembly in accordance with the present invention includes a tire having a pneumatic cavity, first and second sidewalls, a sidewall groove, an air passageway, and a pressure regulator mounted to an inner surface of the pneumatic tire cavity. The pressure regulator controls air pressure within the pneumatic tire cavity. The first and second sidewalls extend respectively from first and second tire bead regions to a tire tread region. The first sidewall has at least one bending region operatively bending when circumferentially within a rolling tire footprint. The sidewall groove defining groove sidewalls positioned within the bending region of the first tire sidewall. The groove deforms segment by segment between a non-deformed state and a deformed, constricted state in response to the bending of the first sidewall bending region circumferentially within the rolling tire footprint. The air passageway resiliently deforms segment by segment between an expanded condition and an at least partially collapsed condition in response to respective segment by segment deformation of the sidewall groove when circumferentially within the rolling tire footprint.

In accordance with another aspect of the tire assembly, the pressure regulator has an elongate cylindrical housing with a rectangular mounting projection.

In accordance with still another aspect of the tire assembly, the rectangular mounting projection has an inlet port and an outlet port for controlling air flow from outside of the pneumatic tire to, and from, the pneumatic tire cavity.

In accordance with yet another aspect of the tire assembly, the cylindrical housing has a hexagonal lug for securing the pressure regulator in a recess in the inner surface of the pneumatic tire cavity.

In accordance with still another aspect of the tire assembly, a rectangular protective housing secures the pressure regulator within a recess by attaching the rectangular protective housing to an inner surface of the pneumatic tire cavity.

In accordance with yet another aspect of the tire assembly, the cylindrical housing of the pressure regulator has a cylindrical lug for engaging a corresponding opening of the rectangular protective housing.

In accordance with still another aspect of the tire assembly, the rectangular protective housing defines a tapered rectangular pocket corresponding to the cylindrical lug of the pressure regulator and a rectangular recess of the inner surface of the pneumatic tire cavity.

In accordance with yet another aspect of the tire assembly, a recess on an inner surface of the pneumatic tire cavity accommodates the entire pressure regulator and a protective sheet covering.

In accordance with still another aspect of the tire assembly, the sheet covering secures the pressure regulator in the recess and defines a flush surface at the inner surface of the pneumatic tire cavity.

In accordance with yet another aspect of the tire assembly, the sheet covering has an opening for receiving a cylindrical lug of the pressure regulator.

A second tire assembly in accordance with the present invention includes a tire having a pneumatic cavity, first and second sidewalls, a sidewall groove, a pressure regulator, an air passageway, and a tube assembly. The first and second sidewalls extend respectively from first and second tire bead regions to a tire tread region. The first sidewall has at least one bending region operatively bending when circumferentially within a rolling tire footprint. The sidewall groove defines groove sidewalls positioned within the bending region of the first tire sidewall. The groove deforms segment by segment between a non-deformed state and a deformed, constricted state in response to the bending of the first sidewall bending region being circumferentially within the rolling tire footprint. The pressure regulator is mounted to an inner surface of the pneumatic tire cavity. The pressure regulator controls air pressure within the pneumatic tire cavity. The air passageway is defined by the sidewall groove and a tube assembly. The air passageway resiliently deforms segment by segment between an expanded condition and an at least partially collapsed condition in response to respective segment by segment deformation of the sidewall groove when circumferentially within the rolling tire footprint. The tube assembly including a first tube secured within the sidewall groove. The first tube resiliently deforms segment by segment between an expanded condition and an at least partially collapsed condition in response to respective segment by segment deformation of the tube assembly when circumferentially within the rolling tire footprint.

In accordance with another aspect of the second tire assembly, the pressure regulator has an elongate cylindrical housing with a rectangular mounting projection.

In accordance with still another aspect of the second tire assembly, the rectangular mounting projection has an inlet port and an outlet port for controlling air flow from outside of the pneumatic tire to, and from, the pneumatic tire cavity.

In accordance with yet another aspect of the second tire assembly, the cylindrical housing has hexagonal lugs for securing the pressure regulator in a recess in the inner surface of the pneumatic tire cavity.

In accordance with still another aspect of the second tire assembly, a rectangular protective housing for securing the pressure regulator at least partially within a recess on an inner surface of the pneumatic tire cavity.

In accordance with yet another aspect of the second tire assembly, the cylindrical housing of the pressure regulator has a cylindrical lug for engaging a corresponding opening of the rectangular protective housing.

In accordance with still another aspect of the second tire assembly, the rectangular protective housing defines a tapered rectangular pocket corresponding to the cylindrical lugs of the pressure regulator and a rectangular recess of the inner surface of the pneumatic tire cavity for at least partially receiving the pressure regulator.

In accordance with yet another aspect of the second tire assembly, a recess on an inner surface of the pneumatic tire cavity accommodates the entire pressure regulator and a protective sheet covering.

In accordance with still another aspect of the second tire assembly, the sheet covering secures the pressure regulator in the recess and defines a flush surface at the inner surface of the pneumatic tire cavity.

In accordance with yet another aspect of the second tire assembly, the sheet covering has an opening for receiving a cylindrical lug of the pressure regulator.

A third tire assembly for use with the present invention may include a tire, first and second tire sidewalls, and a sidewall groove. The tire has a pneumatic cavity. The first and second sidewalls extending respectively from first and second tire bead regions to a tire tread region. The first sidewall has at least one bending region operatively bending when radially within a rolling tire footprint of the tire. The sidewall groove is defined by groove sidewalls positioned within the bending region of the first tire sidewall. The sidewall groove deforms segment by segment between a non-deformed state and a deformed, constricted state in response to the bending of the first sidewall bending region radially within the rolling tire footprint. An air passageway is defined by the sidewall groove and a cover strip. The air passageway resiliently deforms segment by segment between an expanded condition and an at least partially collapsed condition in response to respective segment by segment deformation of the sidewall groove when radially within the rolling tire footprint. The cover strip is applied at an open end of the sidewall groove for separating the air passageway from ambient air pressure.

According to another aspect of the third tire assembly, the cover strip is cured directly to the first, already cured tire sidewall.

According to still another aspect of the third tire assembly, the cover strip is cured to the first tire sidewall by a heated platen.

According to yet another aspect of the third tire assembly, a separate tube is disposed within the sidewall groove. The separate tube defining a circular air passageway.

According to still another aspect of the third tire assembly, the separate tube has an outer profile corresponding to an inner profile of the sidewall groove.

According to yet another aspect of the third tire assembly, a second cover strip is disposed at an axially inner end of the sidewall groove.

According to still another aspect of the third tire assembly, the first cover strip is cured directly to the first, already cured tire sidewall by a heated platen.

According to yet another aspect of the third tire assembly, the cover strip is cord reinforced.

According to still another aspect of the third tire assembly, the second cover strip is a gum strip.

According to yet another aspect of the third tire assembly, the tire assembly further includes check valves disposed at multiple arcuate positions about the sidewall groove.

A fourth tire assembly for use with the present invention may include a tire, first and second sidewalls, and a sidewall groove. The tire has a pneumatic cavity. The first and second sidewalls extend respectively from first and second tire bead regions to a tire tread region. The first sidewall has at least one bending region operatively bending when radially within a rolling tire footprint of the tire. The sidewall groove is defined by groove sidewalls positioned within the bending region of the first tire sidewall. The groove deforms segment by segment between a non-deformed state and a deformed, constricted state in response to the bending of the first sidewall bending region radially within the rolling tire footprint. An air passageway is defined by the sidewall groove and a tube assembly. The air passageway resiliently deforms segment by segment between an expanded condition and an at least partially collapsed condition in response to respective segment by segment deformation while radially within the rolling tire footprint. The tube assembly comprises a first tube and a second tube. The first tube is secured within the sidewall groove. The second tube is secured within the first tube. The second tube defines the air passageway resiliently deforming segment by segment between an expanded condition and an at least partially collapsed condition in response to respective segment by segment deformation of the tube assembly when radially within the rolling tire footprint.

According to another aspect of the fourth tire assembly, the first tube is formed of a plastic and the second tube is formed of an extruded polymer.

According to still another aspect of the fourth tire assembly, the second tube has an outer circular cross-section and an inner circular cross-section.

According to yet another aspect of the fourth tire assembly, the first tube comprises relief cuts at axially inner corners of a U-shaped opening for facilitating pinching of the tube assembly.

According to still another aspect of the fourth tire assembly, the second tube has an outer profile corresponding to an inner profile of the first tube.

According to yet another aspect of the fourth tire assembly, the first tube comprises outer radial extensions engaging corresponding recesses in the sidewall groove for circumferentially securing the tube assembly within the sidewall groove.

According to still another aspect of the fourth tire assembly, the outer radial extensions project radially inward.

According to yet another aspect of the fourth tire assembly, the outer radial extensions project radially outward.

According to still another aspect of the fourth tire assembly, the tire assembly further includes an adhesive securing the first tube within the sidewall groove.

According to yet another aspect of the fourth tire assembly, the first tube comprises an inner partially closed U-shaped profile in cross-section and an outer partially closed U-shaped profile in cross-section.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tire dimensioned and configured in section for receipt of an air tube therein.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by a shape with adjacent grooves.

"Tread Arc Width" means the arc length of the tread as measured between the lateral edges of the tread.

BRIEF DESCRIPTION OF THE DRAWINGS

The present invention will be described by way of example and with reference to the accompanying drawings, in which:

FIGS. 4A & 4B; Schematic details of an example "L" inlet connector.

FIGS. 5A & 5B; Schematic details of an example inlet/filter connector.

FIG. 19; Schematic perspective view the example tube assembly of FIG. 17.

FIGS. 20A & 20B; Schematic details of an example "T" inlet connector.

FIGS. 21A & 21B; Schematic details of an example "T" outlet connector.

DETAILED DESCRIPTION OF EXAMPLES OF THE PRESENT INVENTION

Figure 1:
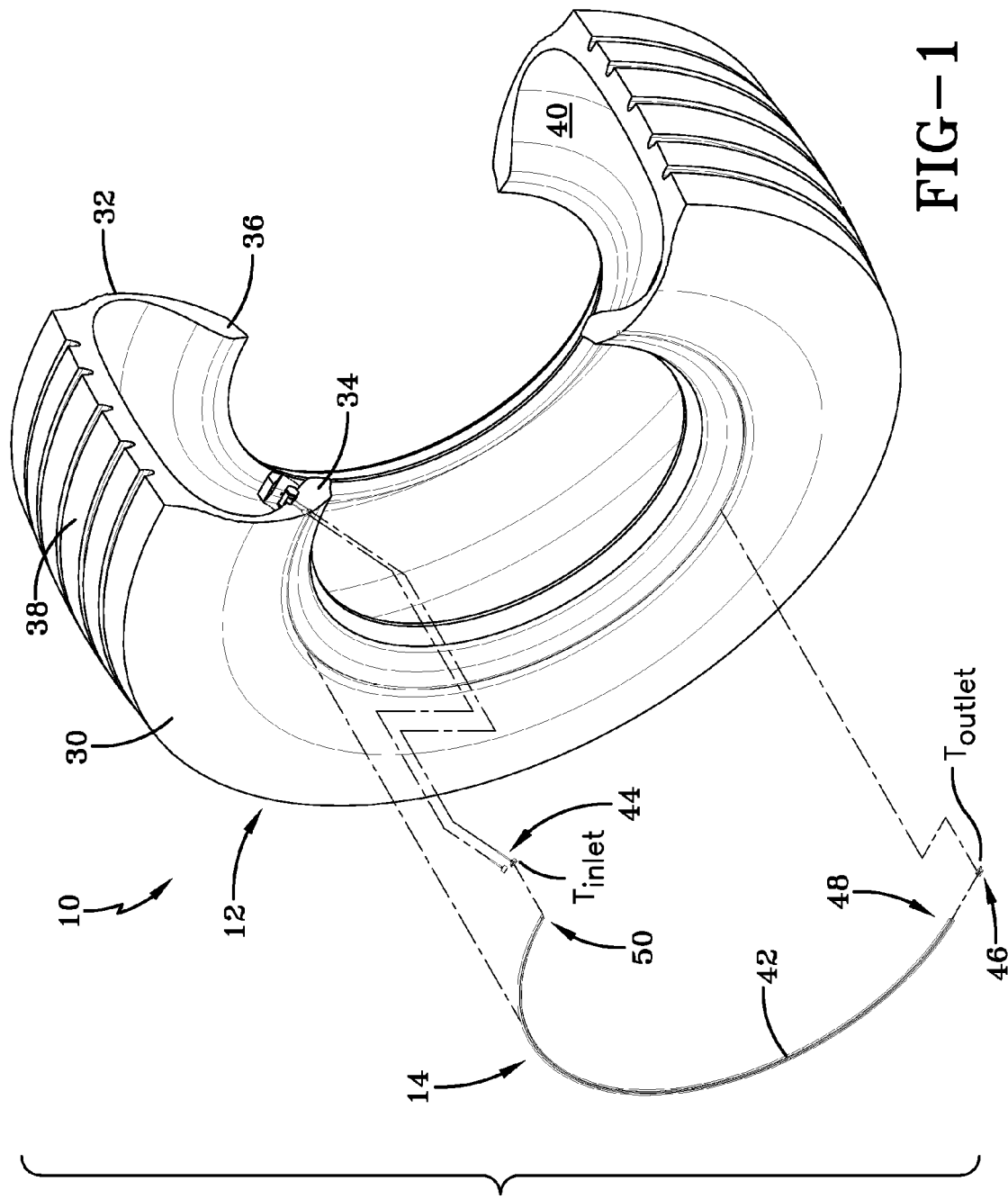
FIG. 1; Isometric exploded view of an example tire and tube assembly.
Figure 2:
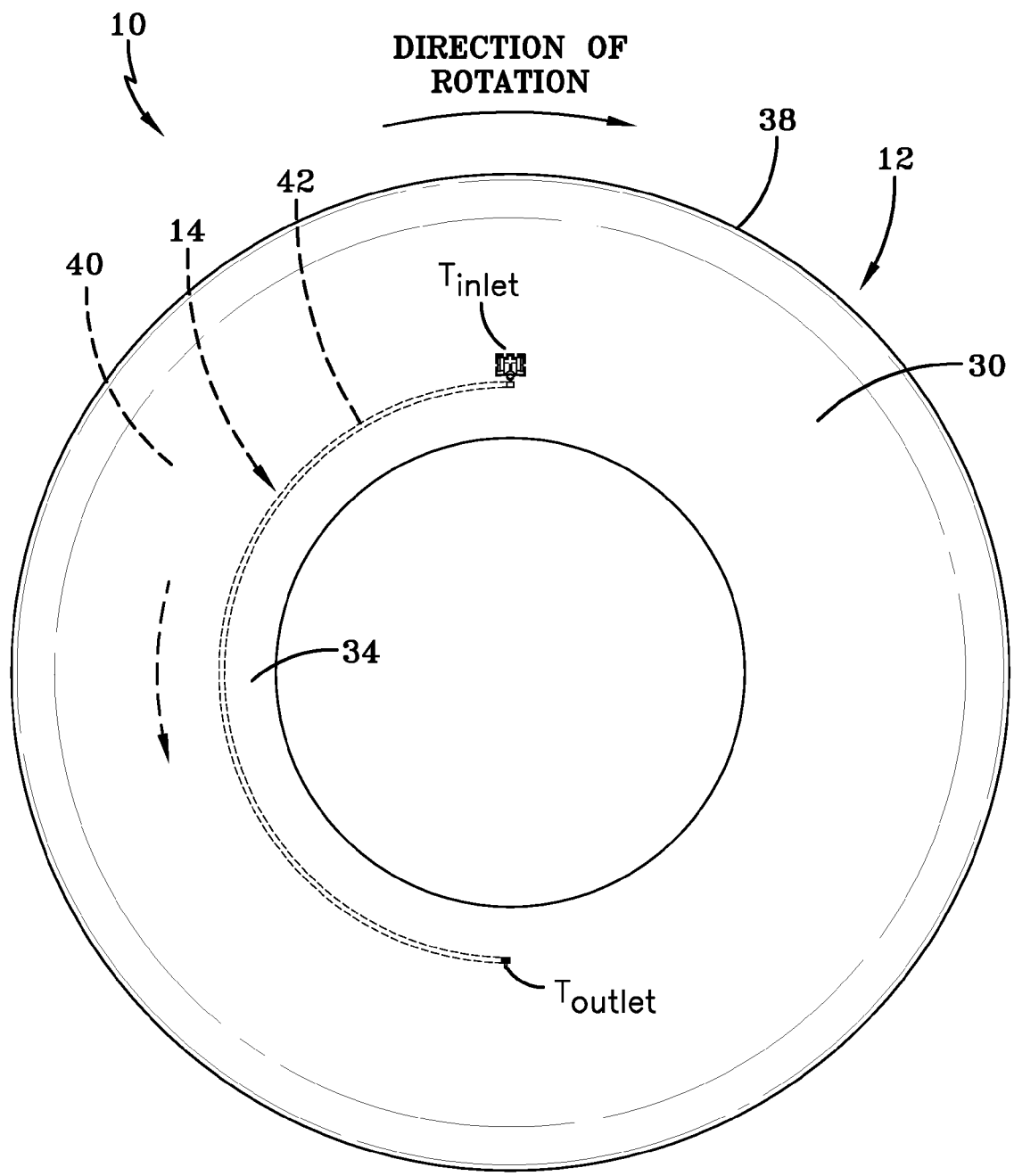
FIG. 2; Side view of the example tire/tube assembly of FIG. 1.
Figure 3:
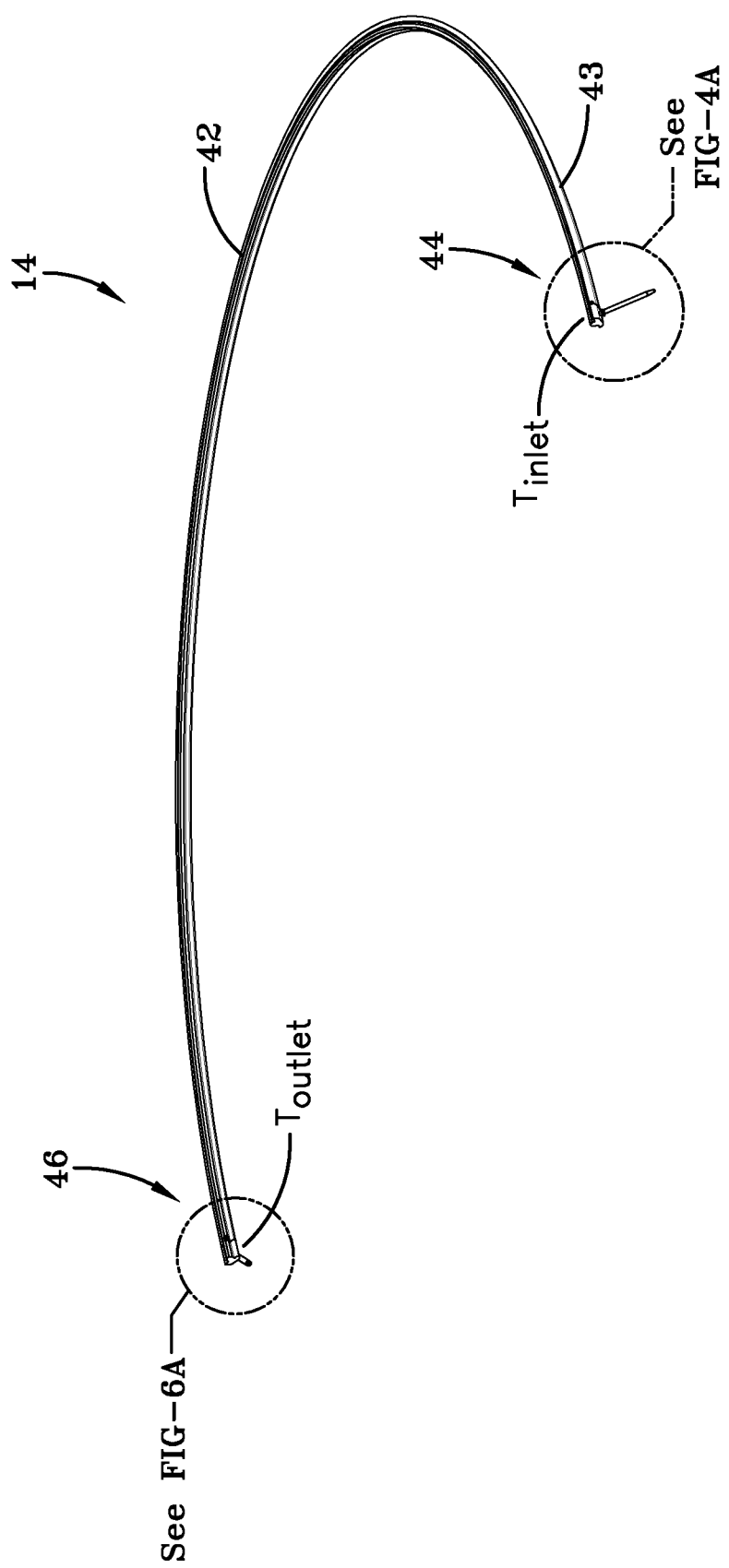
FIG. 3; Schematic perspective view the example tube assembly of FIG. 1.

Referring to FIGS. 1-3, an example tire assembly 10 in accordance with the present invention may include a pneumatic tire 12, a peristaltic pump assembly 14, and a tire rim (not shown). The pneumatic tire 12 may mount in conventional fashion to a pair of rim mounting surfaces adjacent outer rim flanges. The pneumatic tire 12 may be of conventional construction, having a pair of sidewalls 30, 32 extending from opposite bead areas 34, 36 to a crown or tread region 38. The pneumatic tire 12 and rim may enclose a tire cavity 40.

The example peristaltic pump assembly 14 may include an annular 180 degree air tube 42 that encloses an annular passageway 43. The example tube 42 may be formed of a resilient, flexible material such as plastic or rubber compounds that are capable of withstanding repeated deformation cycles of a flattened condition subject to external force and, upon removal of such force, returned to an original condition generally circular in cross-section. The example tube 42 may have a diameter sufficient to operatively pass a volume of air for purposes described herein and allowing a positioning of the tube in an operable location within the example tire assembly 10 as will be described below. In the example configuration shown, the tube 42 may be an elongate, generally T-shaped in cross-section, having opposite tube connector assemblies 44, 46 extending in operation from a flat (closed) trailing tube end 48 to a radiussed (open) leading tube end 50. The tube 42 may have a longitudinal outwardly projecting pair of locking detent ribs (not shown) of generally semi-circular cross-section with each rib extending along outward surfaces of the tube.

As shown in FIGS. 9A, 9B, 9C, 9D, 10A & 10B, the example tube 42 may be profiled and geometrically configured for insertion into a groove 56. The groove 56 may have an elongate, generally T-shaped configuration. The example peristaltic pump assembly 14 may further include an inlet device 68 (FIG. 4A) and an outlet device 70 (FIG. 6A)/filter device 168 (FIG. 5A) spaced apart approximately 180 degrees at respective ends of the circumferential 180 degree air tube 42.

The example inlet device 68 of FIGS. 4A & 4B has an L-shaped configuration in which conduits 71, 73 direct air to, and from, the tire cavity 40. The inlet device 68 may have an inlet device housing 75 from which the respective conduits 71, 73 extend. Each of the conduits 71, 73 may have external coupling ribs 81, 83 for retaining the conduits within the open ends of the air tube 42 in an assembled condition. The housing 75 may be formed with an external geometry complementing the groove 56. The housing 75 may thus be capable of close receipt corresponding to the groove 56 at its intended location.

The example filter device 168 of FIGS. 5A & 5B has an elongate configuration in which an air intake 171 and a conduit 173 direct air to, and from, the tire cavity 40. The filter device 168 may have a filter device housing 175 from which the conduit 173 extends. The conduit 173 may have external coupling ribs 183 for retaining the conduit within the open end of the air tube 42 in an assembled condition. The housing 175 may be formed with an external geometry complementing an air intake opening 134 in an outer surface 135 of the bead area 34 of the pneumatic tire 12. The housing 175 may thus be capable of close receipt corresponding to the air intake opening 134 at its intended location.

Figure 7A:
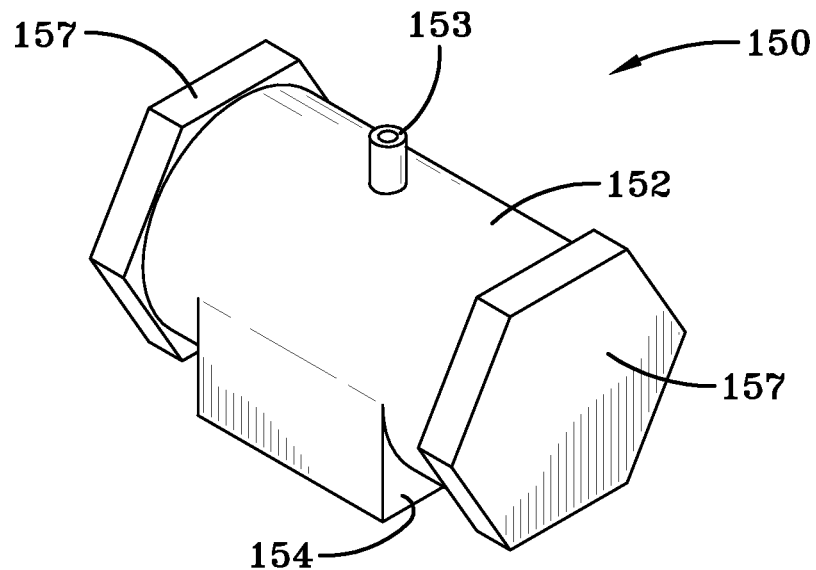
FIGS. 7A & 7B; Schematic perspective top and bottom views of an example regulator in accordance with the present invention.
Figure 7B:
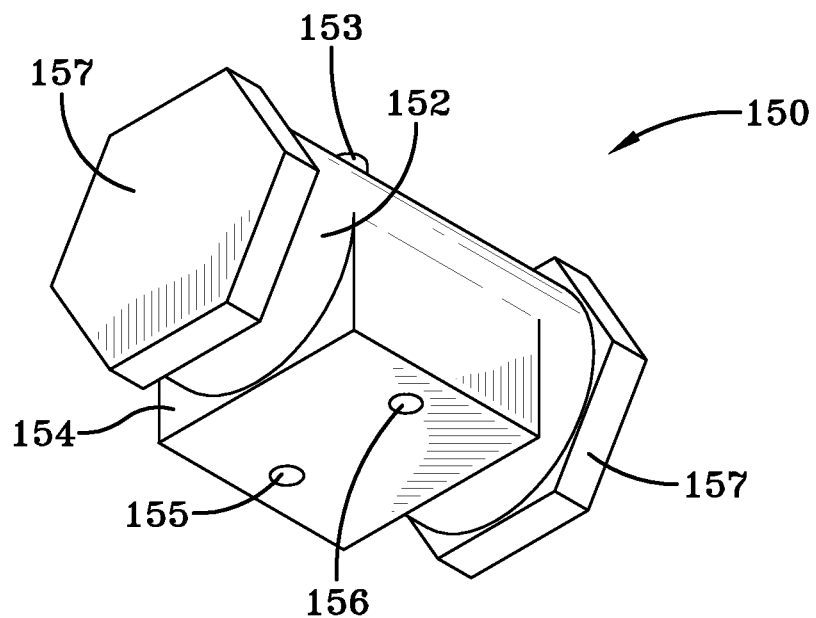
Figure 8A:
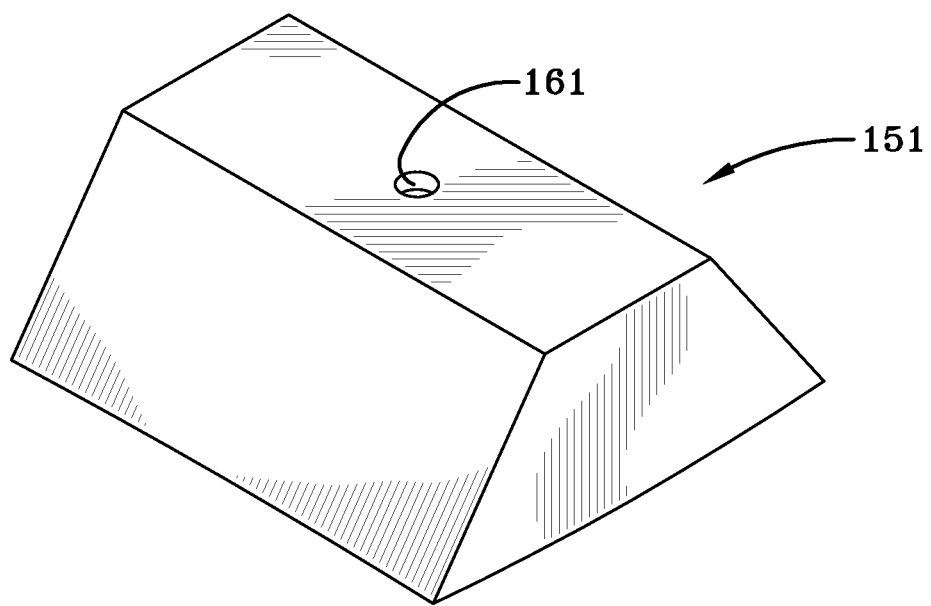
FIGS. 8A & 8B; Schematic perspective top and bottom views of an example regulator protection device in accordance with the present invention.
Figure 8B:
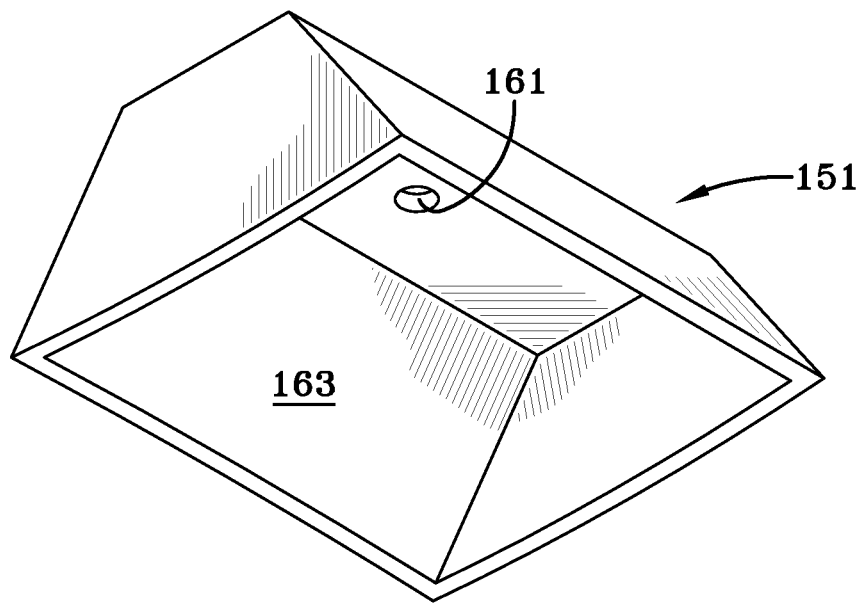
Figure 9A:
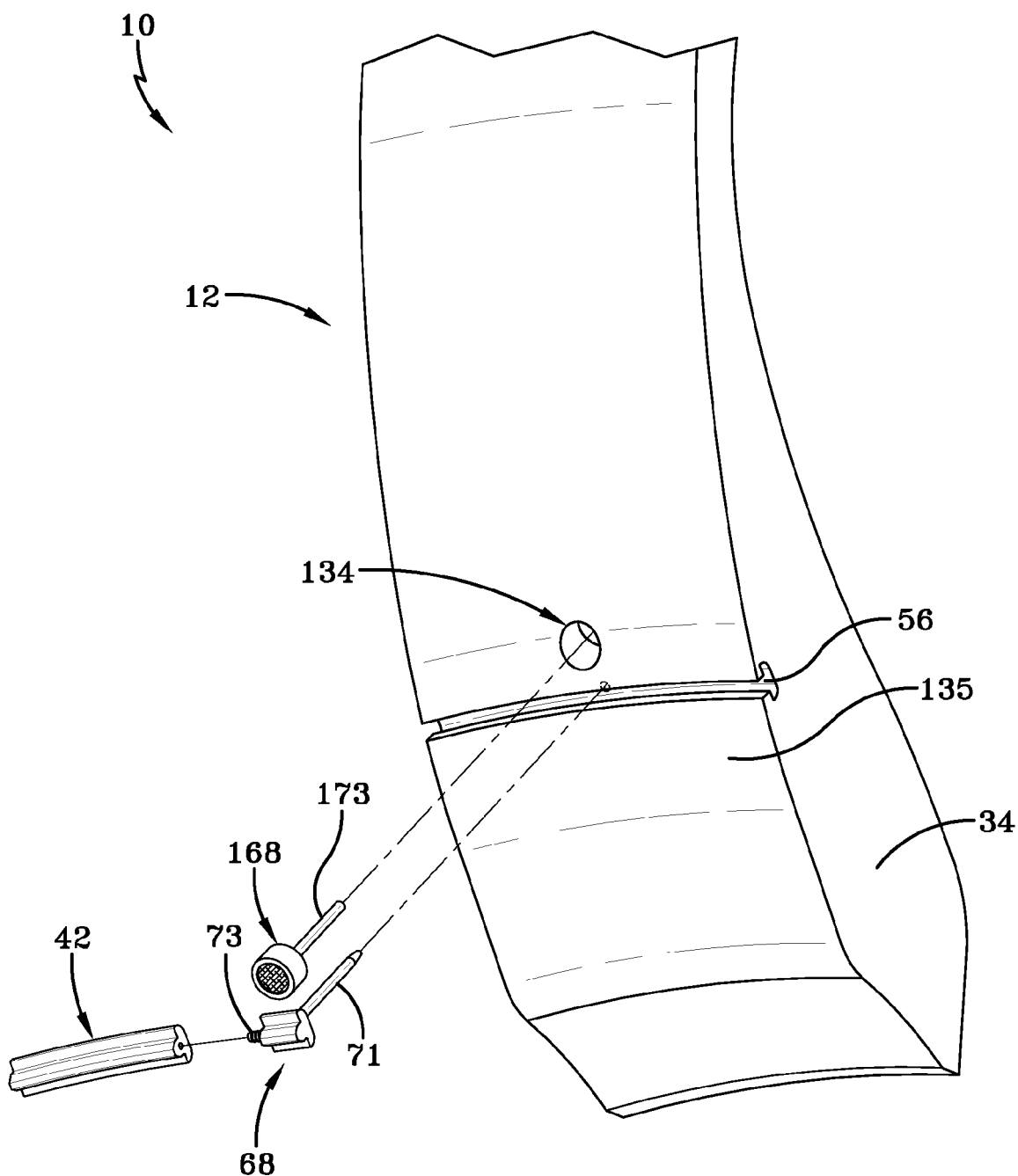
FIG. 9A; Schematic perspective exploded view of the example inlet area of FIG. 1 external to the tire in accordance with the present invention.
Figure 9B:
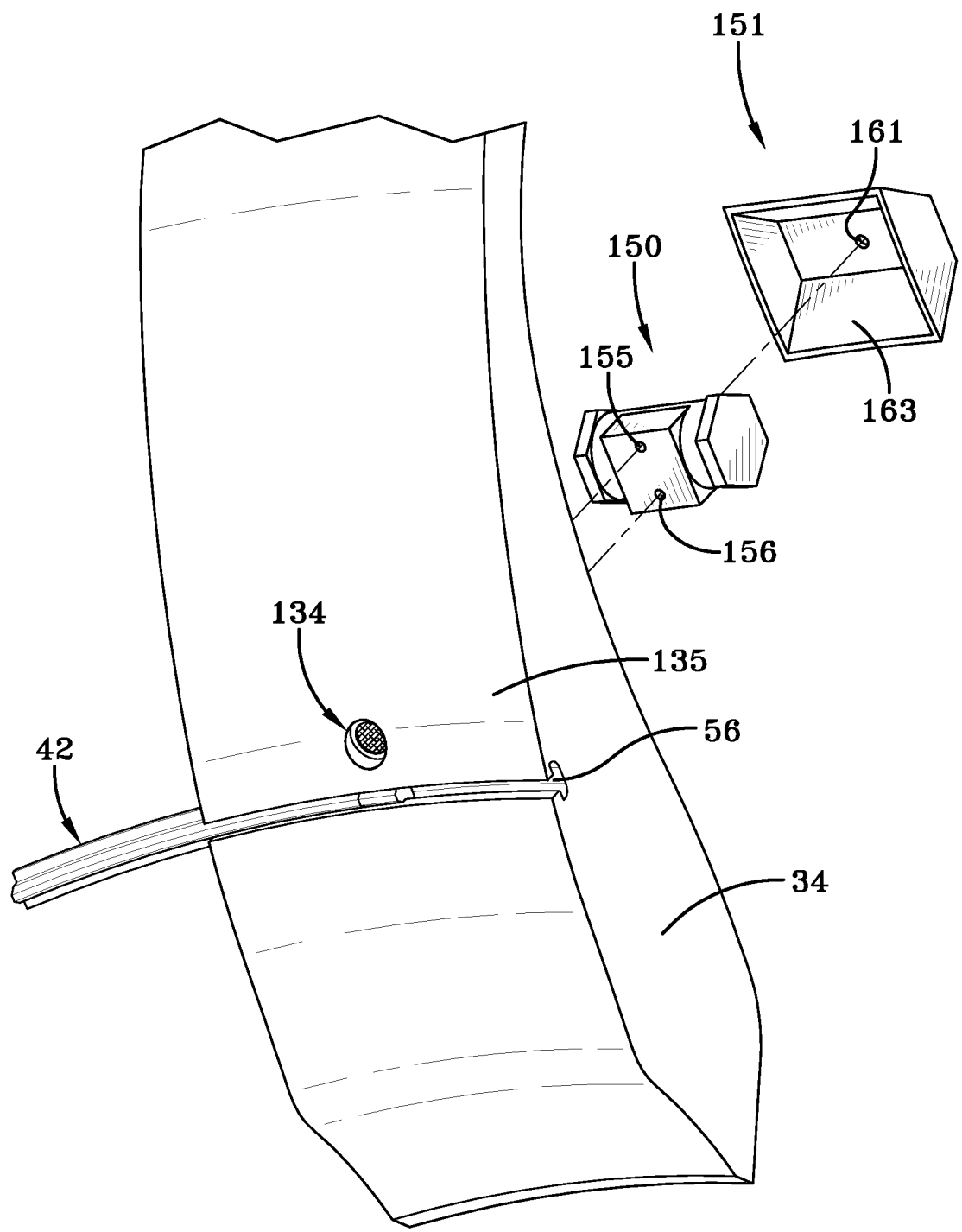
FIG. 9B; Schematic perspective exploded view of the example inlet area of FIG. 9A with the example regulator of FIGS. 7A & 7B and the example regulator protection device of FIGS. 8A & 8B.
Figure 9C:
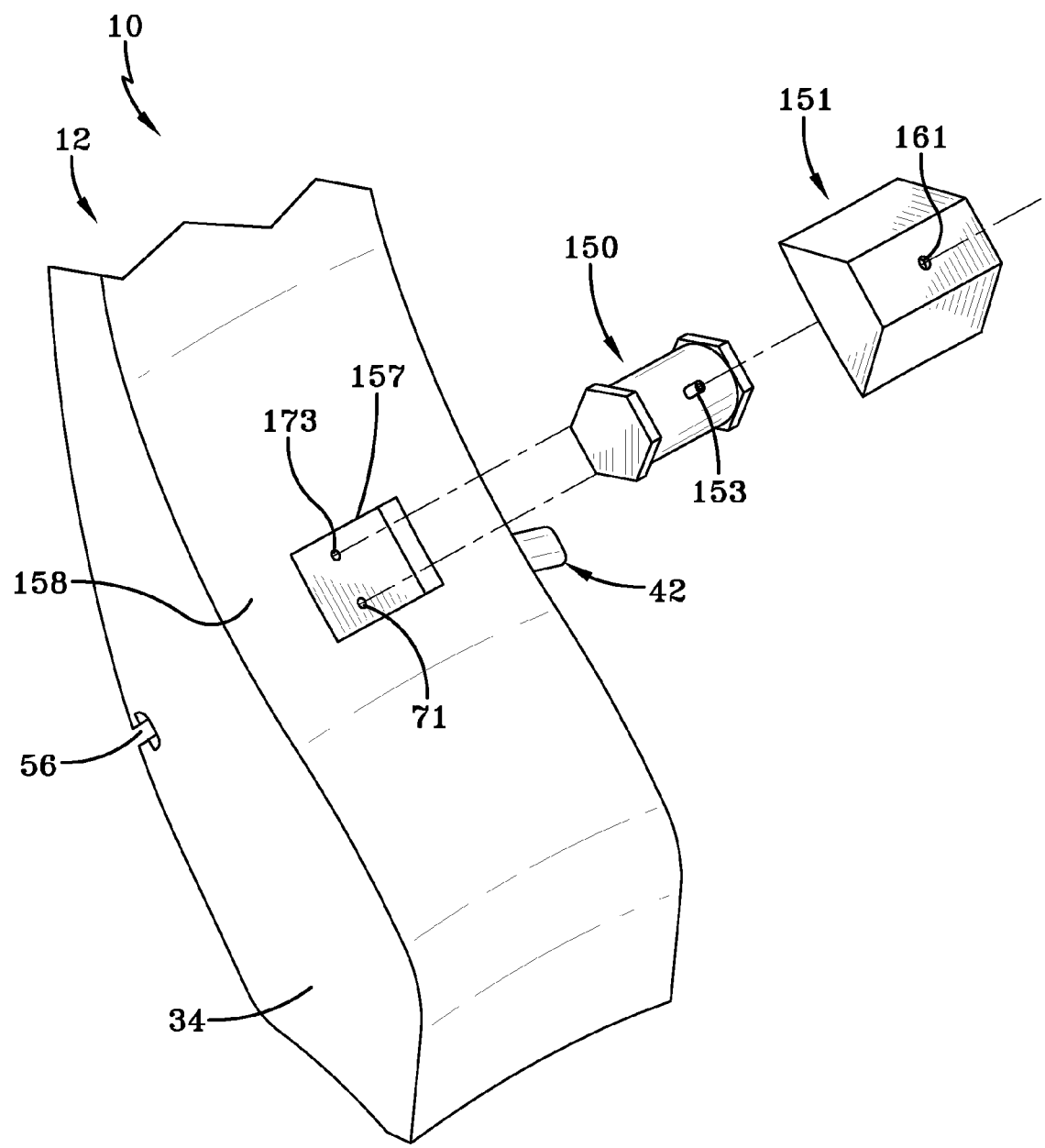
FIG. 9C; Schematic perspective exploded view of the example inlet area of FIG. 9A viewed from internal to the tire in accordance with the present invention.
Figure 9D:
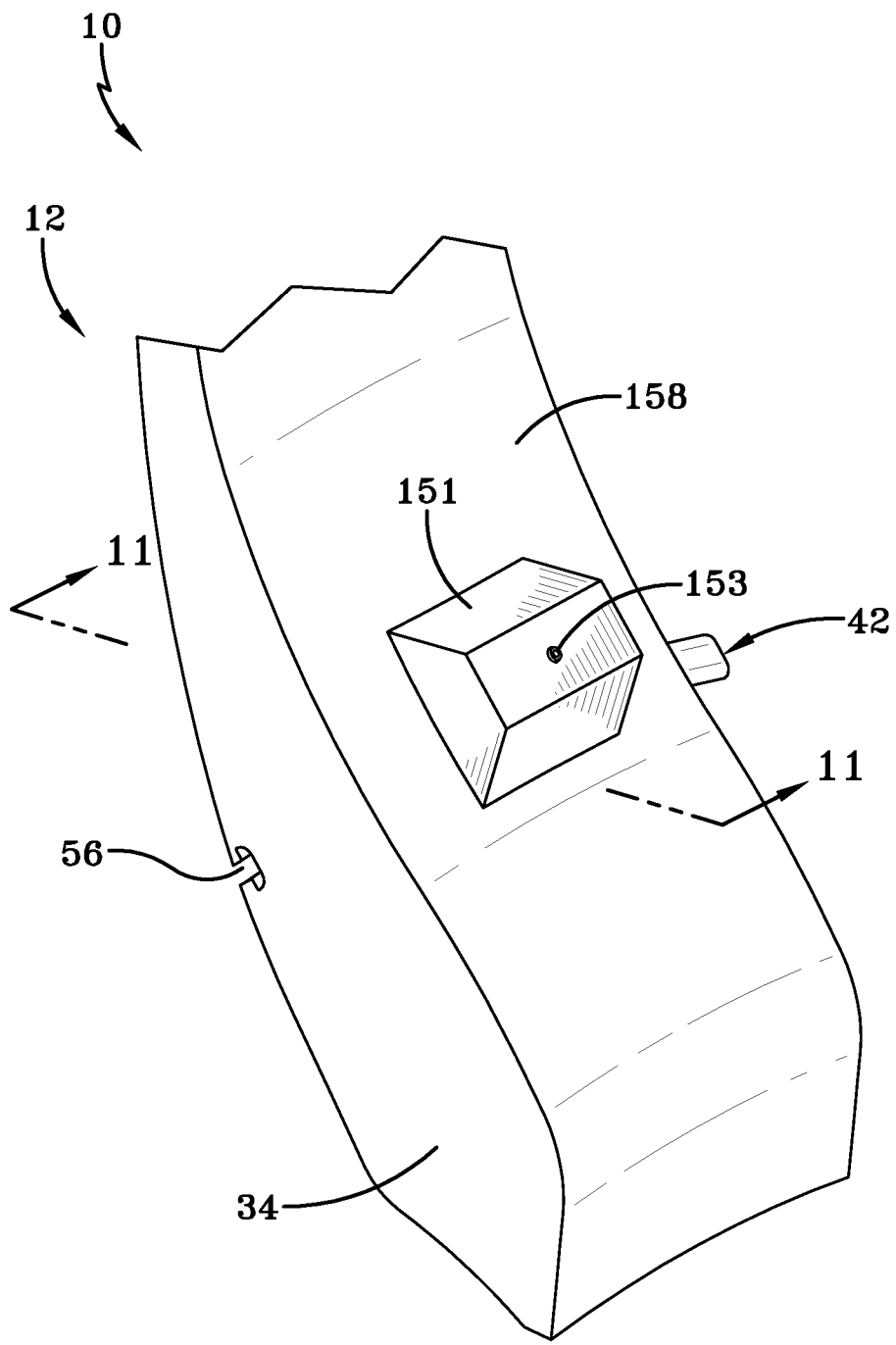
FIG. 9D; Schematic perspective assembled view of the example inlet area of FIG. 9C.

An example pressure regulator 150 (FIGS. 7A & 7B) may have an elongate cylindrical housing 152 with a rectangular mounting projection 154. The mounting projection 154 may have an inlet port 155 and an outlet port 156 for controlling air flow from outside of the pneumatic tire 12 to and from the tire cavity 40. The cylindrical housing may have hexagonal lugs 167 for securing the pressure regulator 150 in a recess 157 on an inner surface 158 of the bead area 34. A rectangular protective housing 151 (FIGS. 8A & 8B) may secure the pressure regulator 150 within the recess 157 (FIGS. 9C & 9D) by attaching the housing 151 to the inner surface 158 of the bead area 34. The cylindrical housing 152 of the pressure regulator 150 may have a cylindrical lug 153 for engaging a corresponding hole 161 of the rectangular housing 151 (FIGS. 9A, 9B, 9C & 9D).

Figure 11:
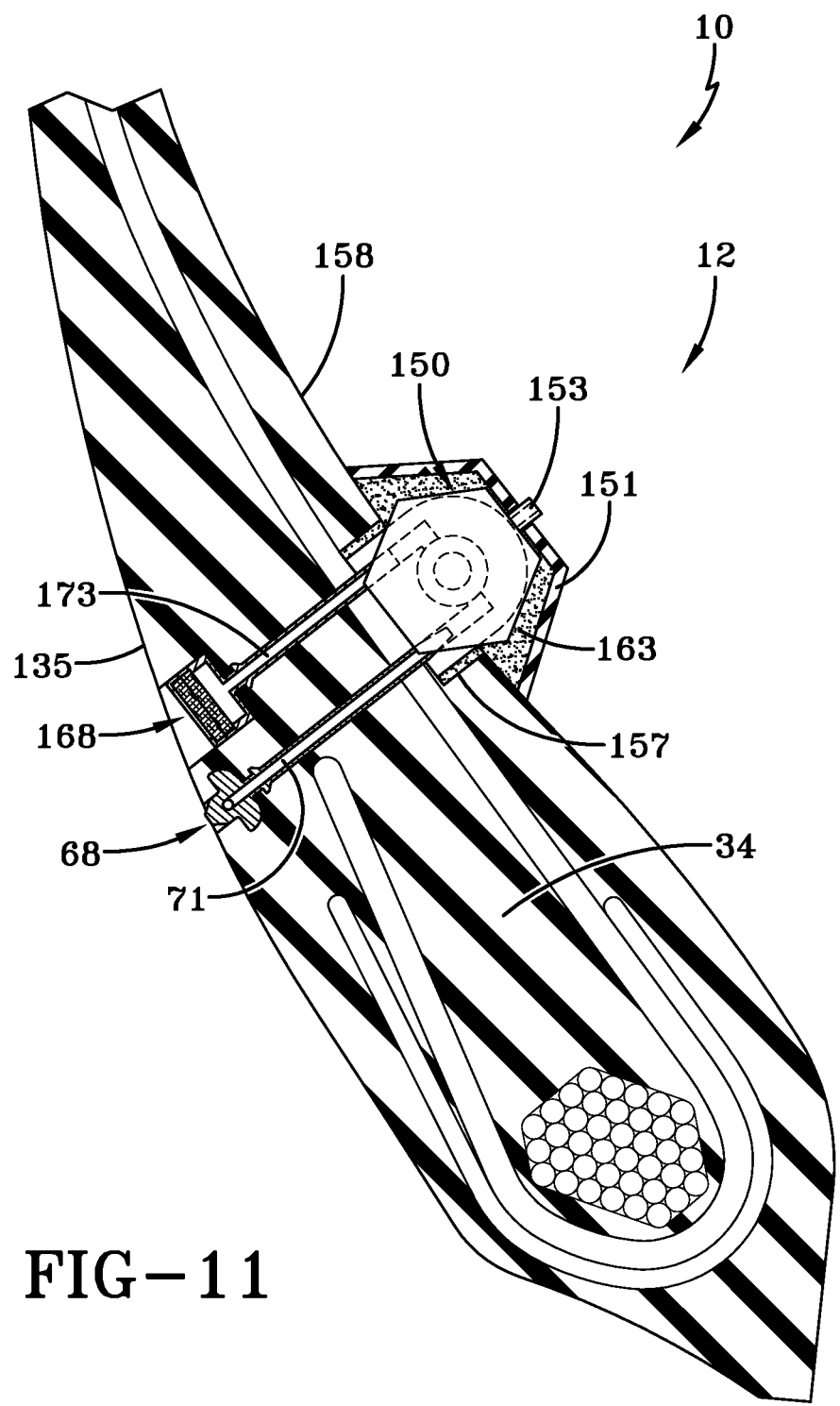
FIG. 11; Schematic sectional view of the assembled example inlet area of FIGS. 9A-9D.

The pressure regulator 150 and protective housing 151 may be assembled in a post-cure process of the pneumatic tire 12. The housing 151 may create a tapered rectangular pocket 163 corresponding to the lugs 167 of the pressure regulator 150 and the rectangular recess 157 of the bead area 34 for securing the pressure regulator 150 to the bead area. This assembly 150, 151, 157 thus may protect the pressure regulator 150, the conduits 71, 173, and the retreading bladder (not shown) during a retreading operation (FIG. 11).

Figure 12:
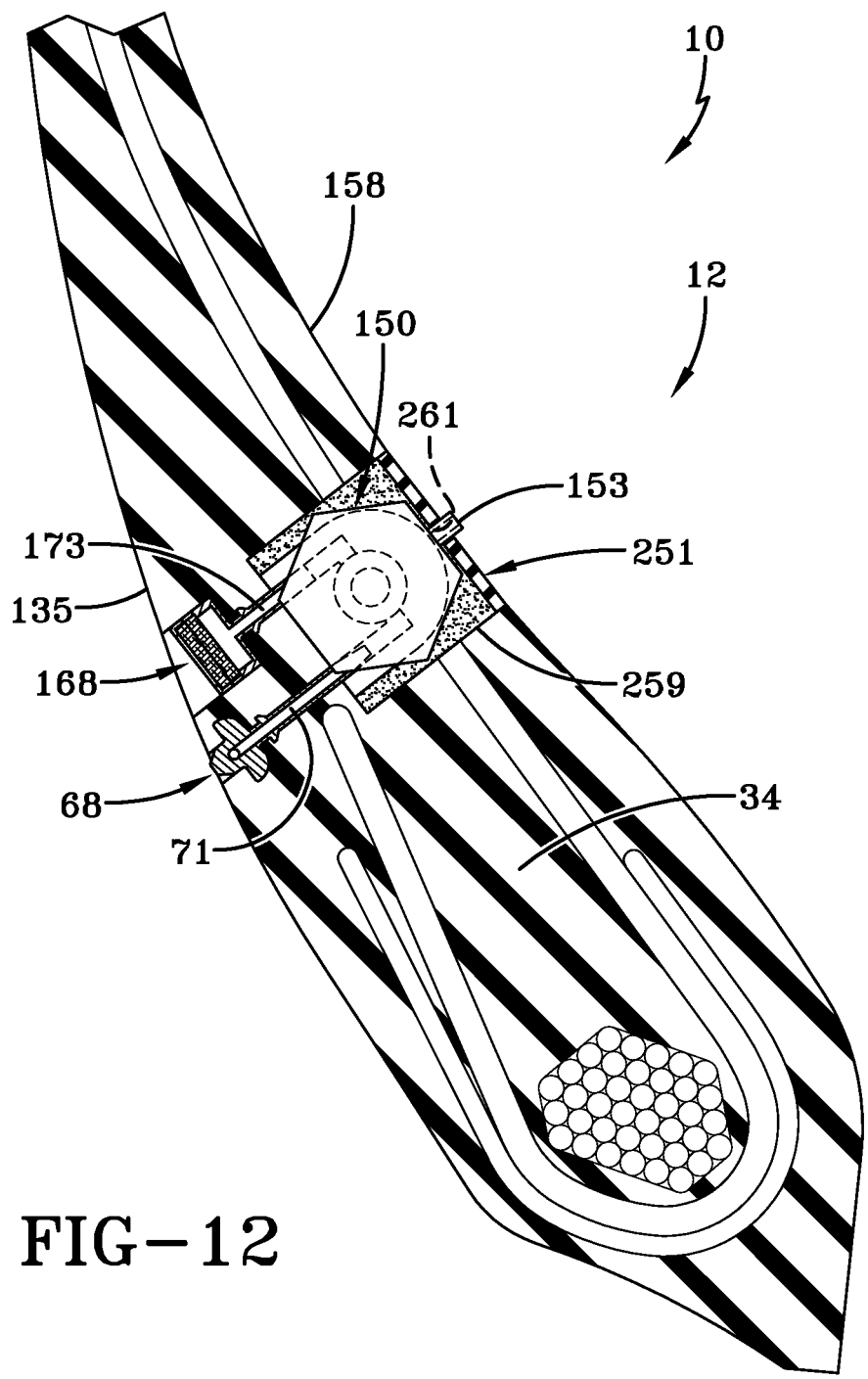
FIG. 12; Schematic sectional view of another example inlet area.
Figure 13:
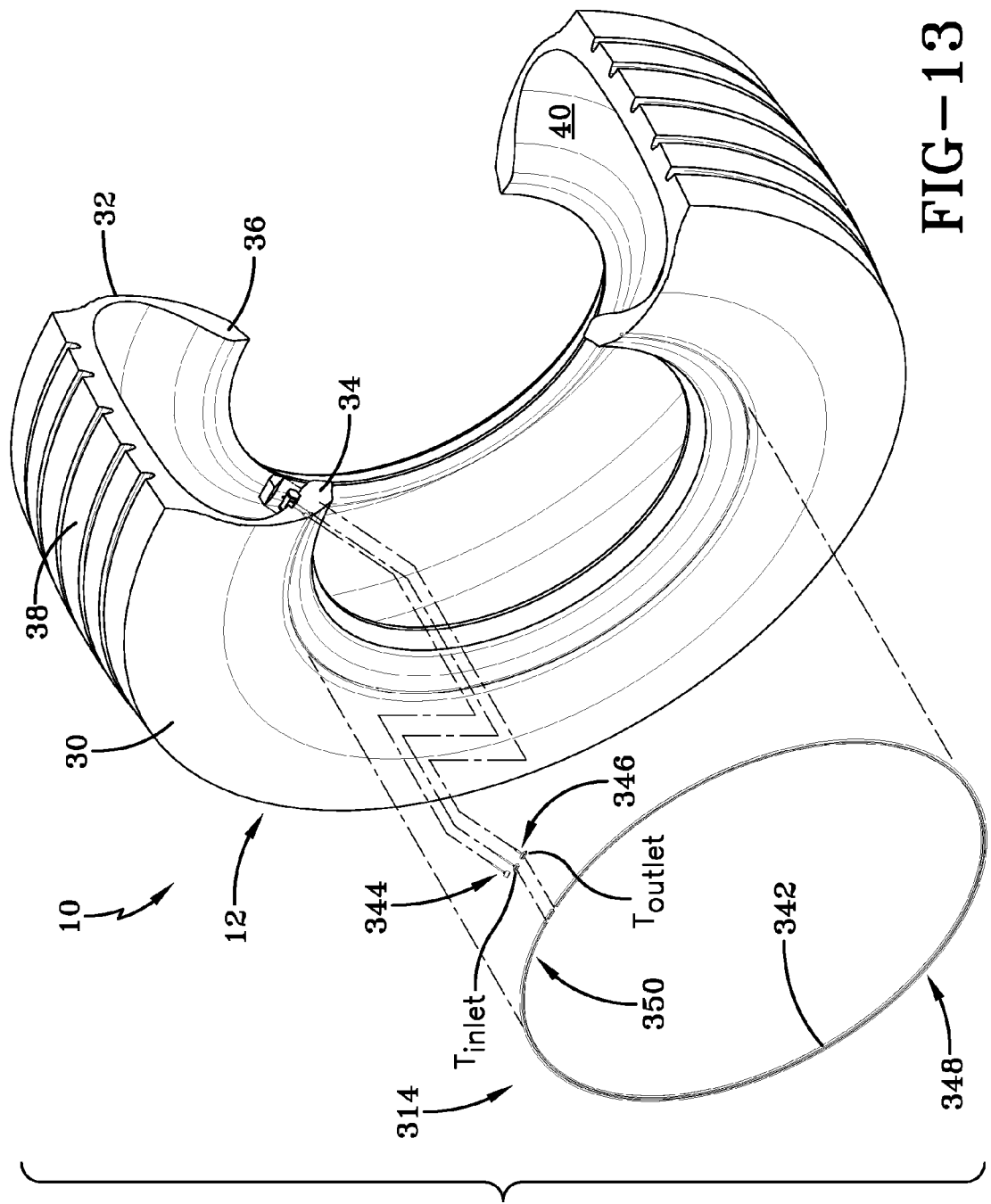
FIG. 13; Isometric exploded view of another example tire and tube assembly.
Figure 14:
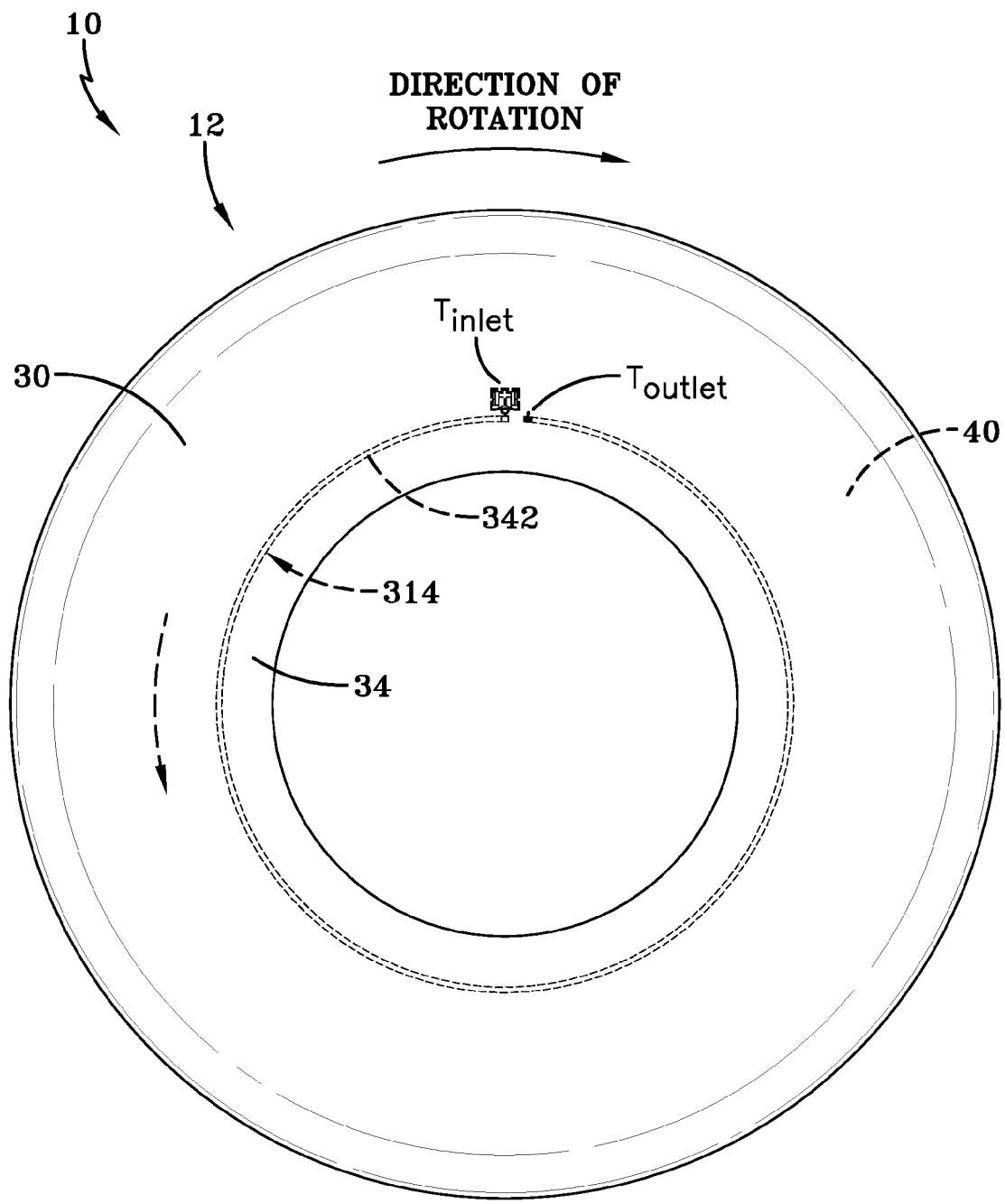
FIG. 14; Side view of the example tire/tube assembly of FIG. 13.
Figure 15:
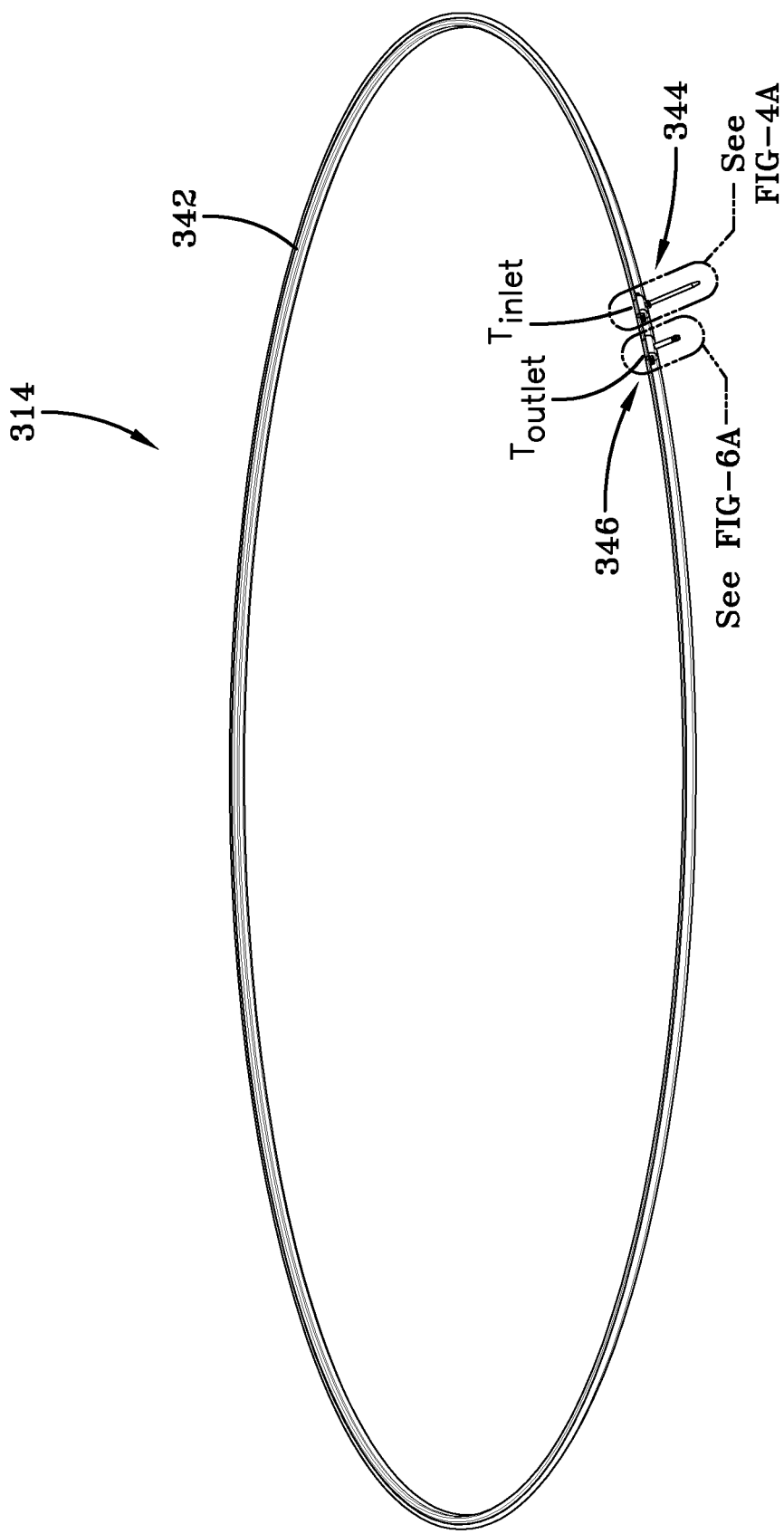
FIG. 15; Schematic perspective view the example tube assembly of FIG. 13.

The example pressure regulator 150 may alternatively be assembled with a pneumatic tire 12 have a deeper recess 259 for accommodating the entire pressure regulator and a protective sheet covering 251 instead of the protective housing 151 (FIG. 12). The sheet covering may secure the pressure regulator 150 in the recess 269 and provide a flush surface at the inner surface 158 of the bead area 34 (FIG. 12). The sheet covering 251 may similarly have a corresponding hole 261 for receiving the cylindrical lug 153 of the pressure regulator 150.

Figure 6A:
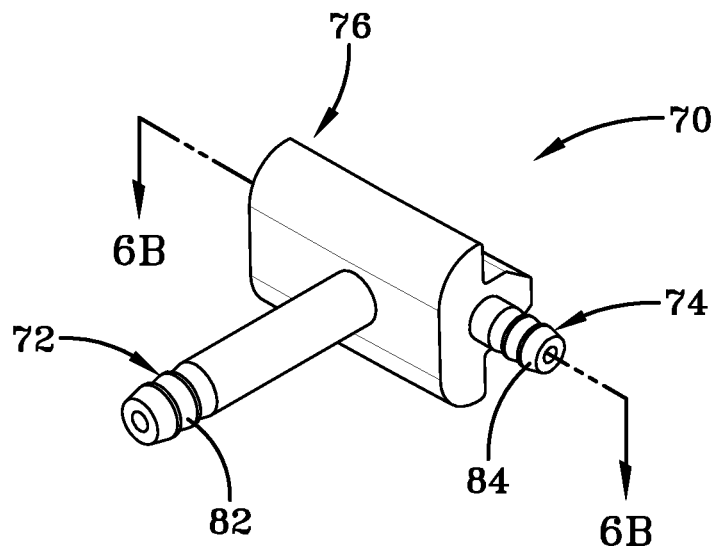
FIGS. 6A & 6B; Schematic details of an example "L" outlet connector.
Figure 6B:
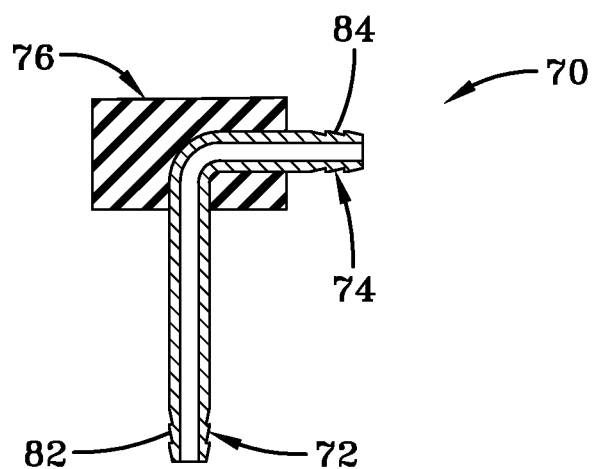
Figure 10A:
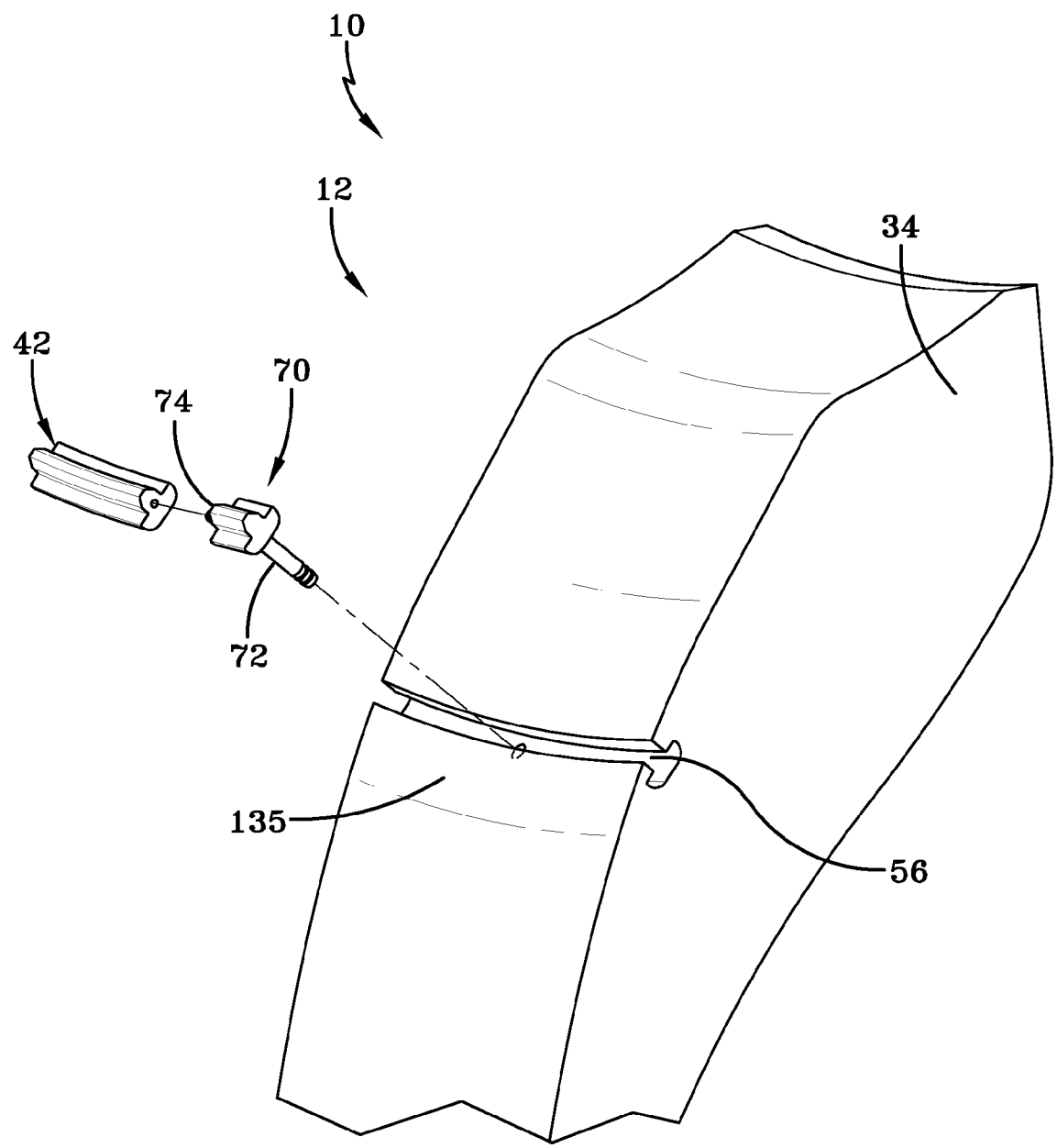
FIG. 10A; Schematic perspective exploded view of the example outlet area of FIG. 1 external to the tire in accordance with the present invention.
Figure 10B:
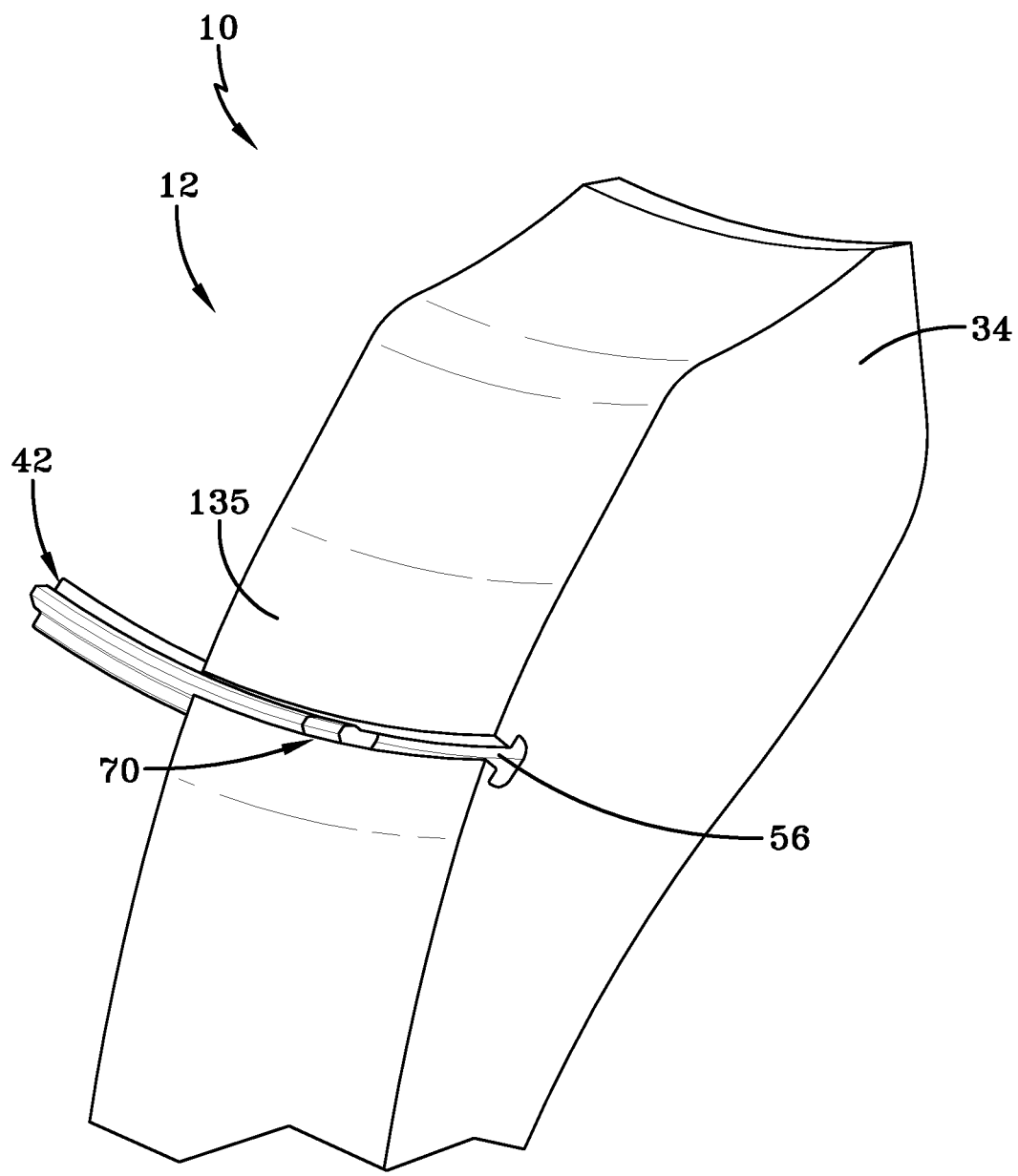
FIG. 10B; Schematic perspective assembled view of the example outlet area of FIG. 10A external to the tire in accordance with the present invention.

The example outlet device 70 of FIGS. 6A & 6B has an L-shaped configuration in which conduits 72, 74 direct air to, and from, the tire cavity 40. The outlet device 70 may have an outlet device housing 76 from which the respective conduits 72, 74 extend. Each of the conduits 72, 74 may have external coupling ribs 82, 84 for retaining the conduits within the open ends of the air tube 42 in an assembled condition. The housing 76 may be formed with an external geometry complementing the groove 56. The housing 76 may thus be capable of close receipt corresponding to the groove 56 at its intended location (FIGS. 10A & 10B).

Referring to FIGS. 13-16C, another example peristaltic pump assembly 314 may include an annular 340-360 degree air tube 342 that encloses an annular passageway 343. The example tube 342 may be formed of a resilient, flexible material such as plastic or rubber compounds that are capable of withstanding repeated deformation cycles of a flattened condition subject to external force and, upon removal of such force, returned to an original condition generally circular in cross-section. The example tube 342 may have a diameter sufficient to operatively pass a volume of air for purposes described herein and allowing a positioning of the tube in an operable location within the example tire assembly 10 as will be described below. In the example configuration shown, the tube 342 may be an elongate, generally T-shaped in cross-section, having opposite tube connector assemblies 344, 346 extending in operation from a flat (closed) section 348 to a radiussed (open) leading section 350. The tube 342 may have a longitudinal outwardly projecting pair of locking detent ribs (not shown) of generally semi-circular cross-section with each rib extending along outward surfaces of the tube.

Figure 16A:
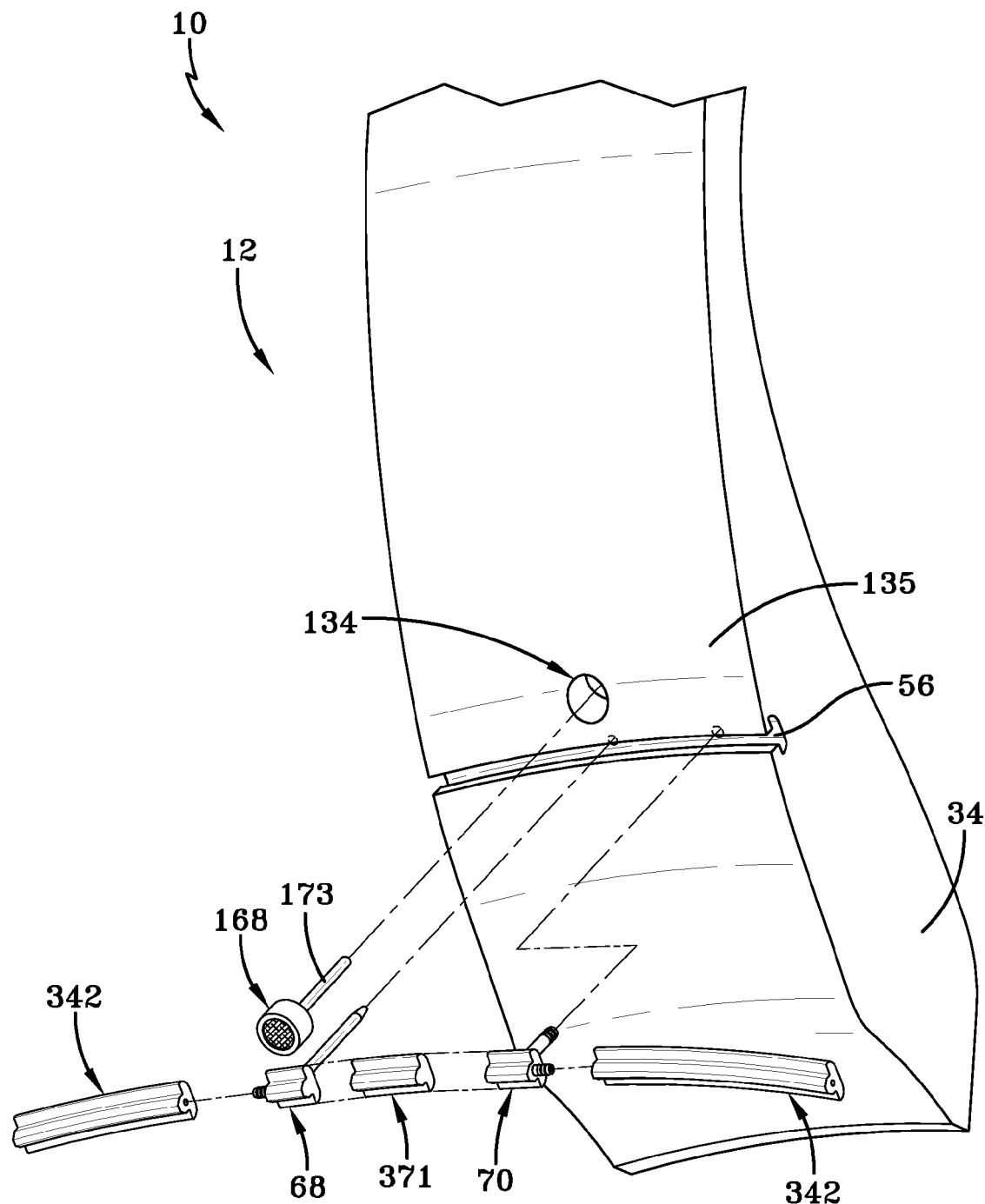
FIG. 16A; Schematic perspective exploded view of the example inlet area of FIG. 13 external to the tire in accordance with the present invention.
Figure 16B:
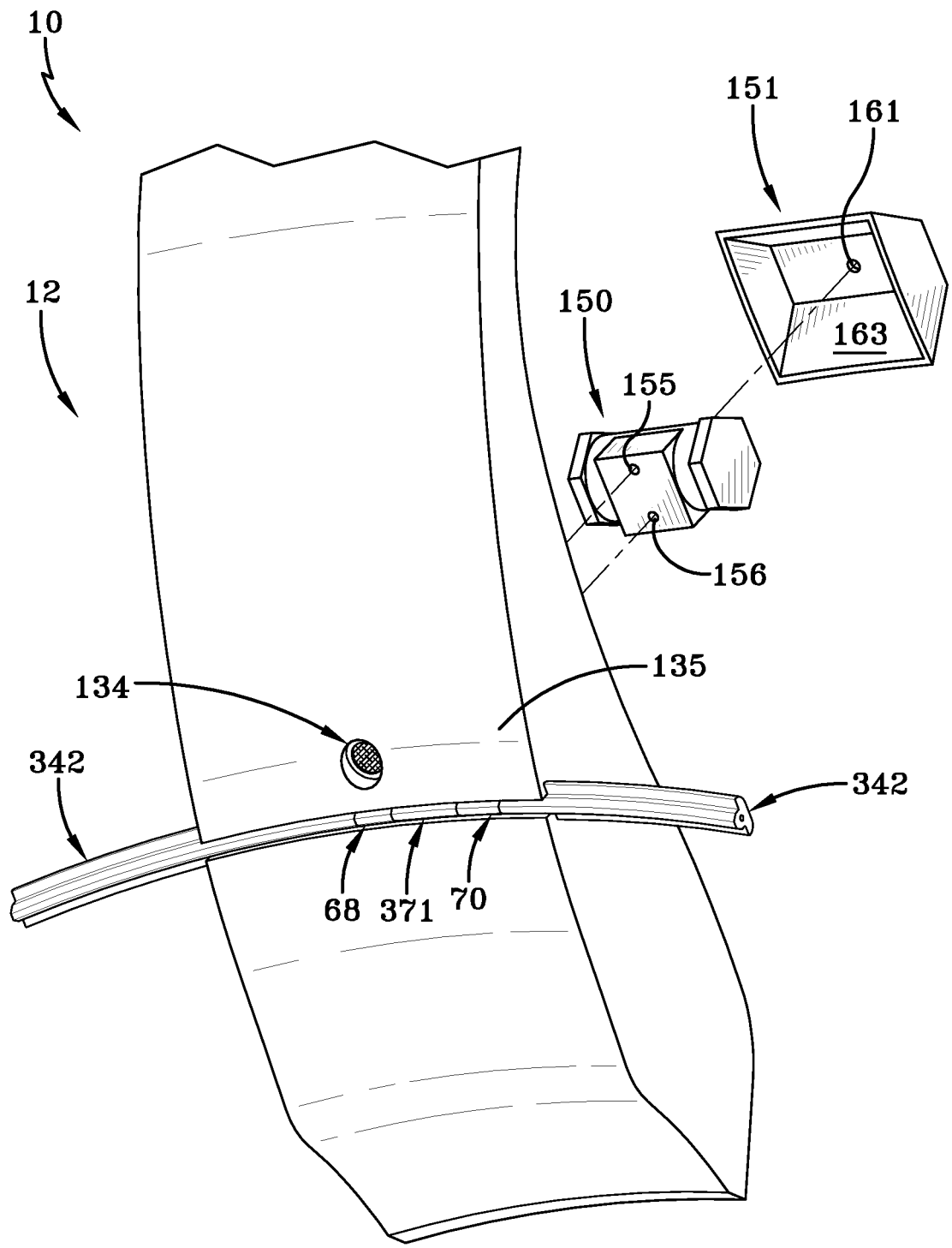
FIG. 16B; Schematic perspective exploded view of the example inlet area of FIG. 16A with the example regulator of FIGS. 7A & 7B and the example regulator protection device of FIGS. 8A & 8B.
Figure 16C:
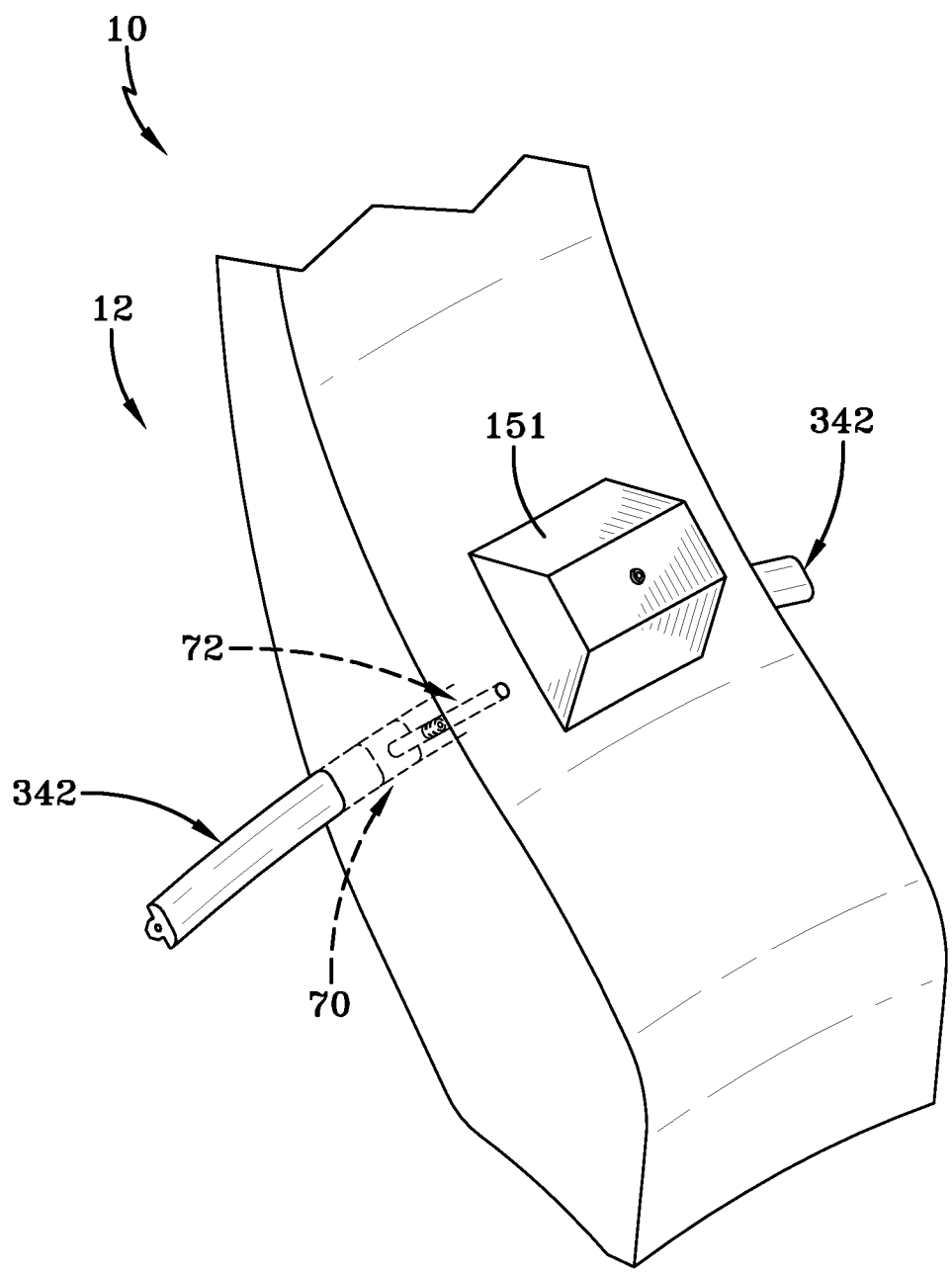
FIG. 16C; Schematic perspective exploded view of the example inlet area of FIG. 16A viewed from internal to the tire in accordance with the present invention.
Figure 17:
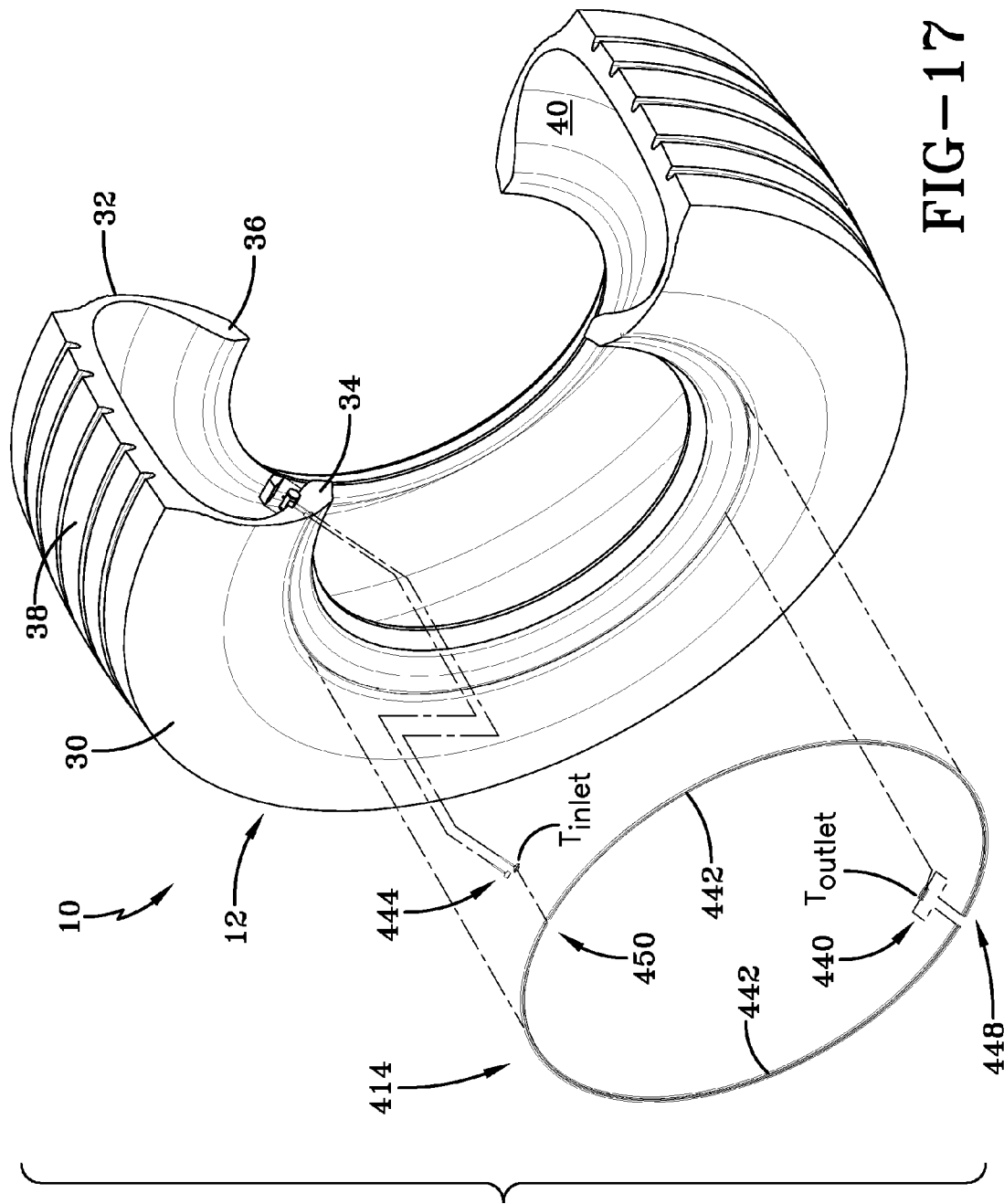
FIG. 17; Isometric exploded view of another bi-directional example tire and tube assembly.
Figure 18:
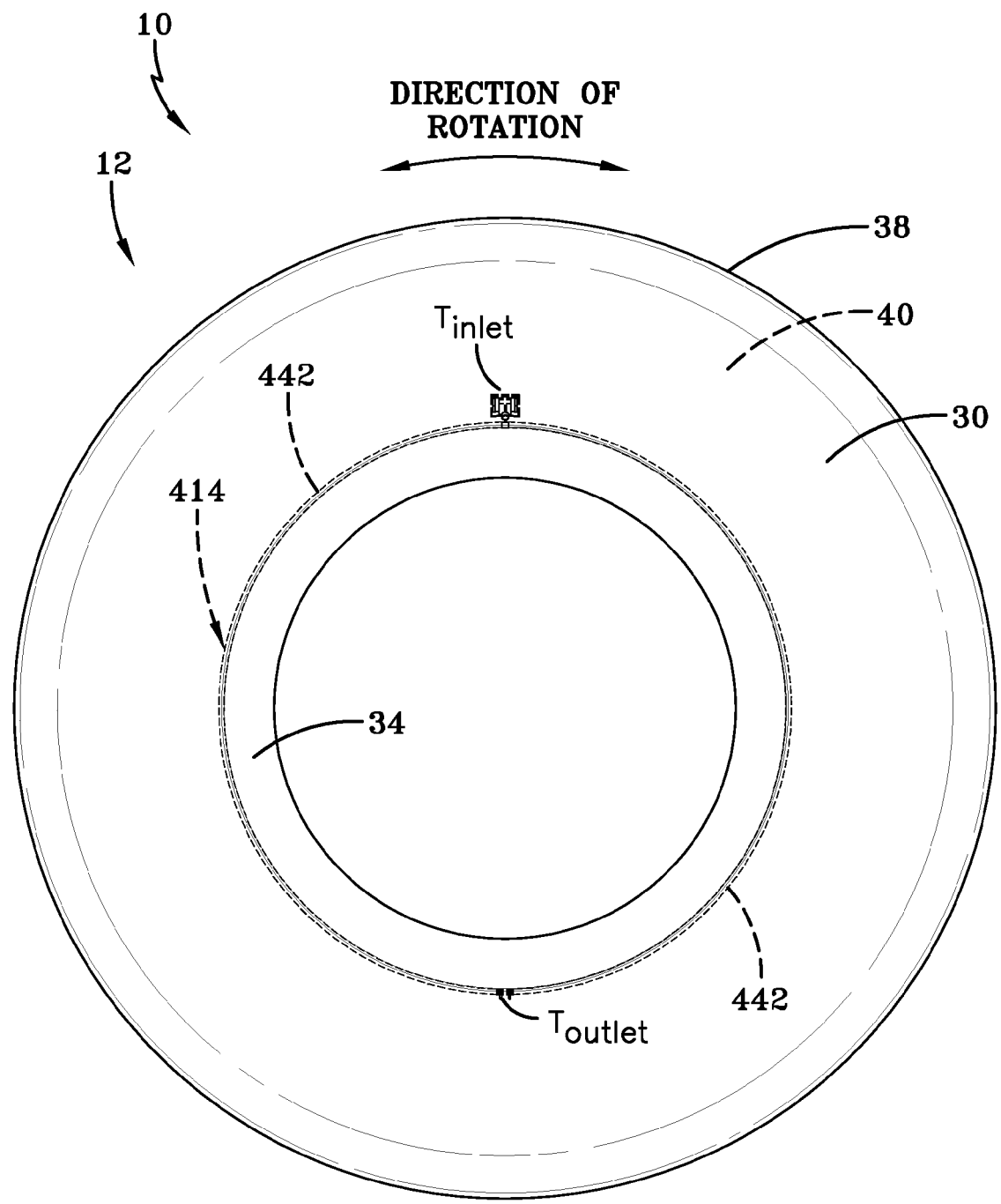
FIG. 18; Side view of the example tire/tube assembly of FIG. 17.
Figure 22A:
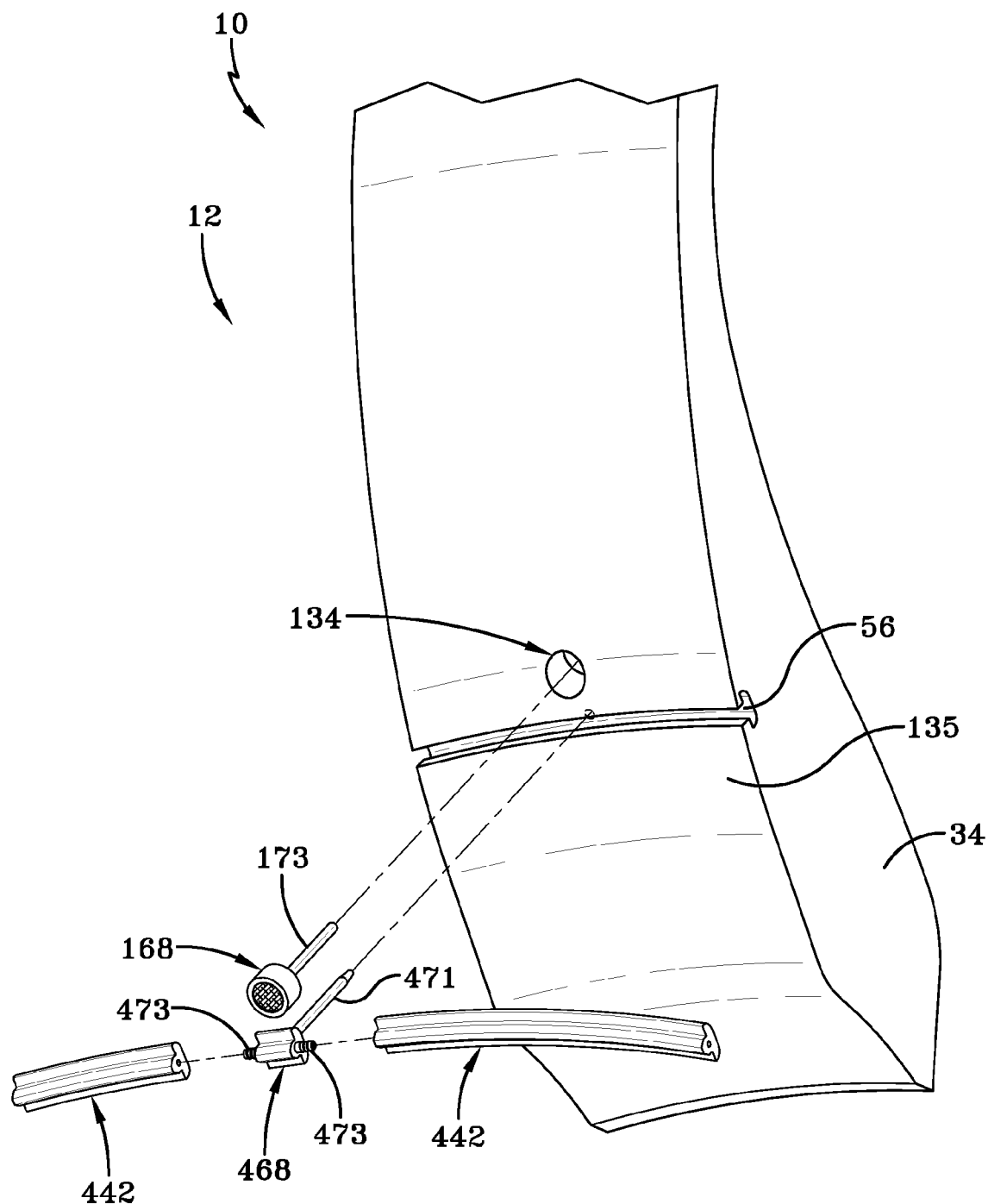
FIG. 22A; Schematic perspective exploded view of the example inlet area of FIG. 17 external to the tire in accordance with the present invention.
Figure 22B:
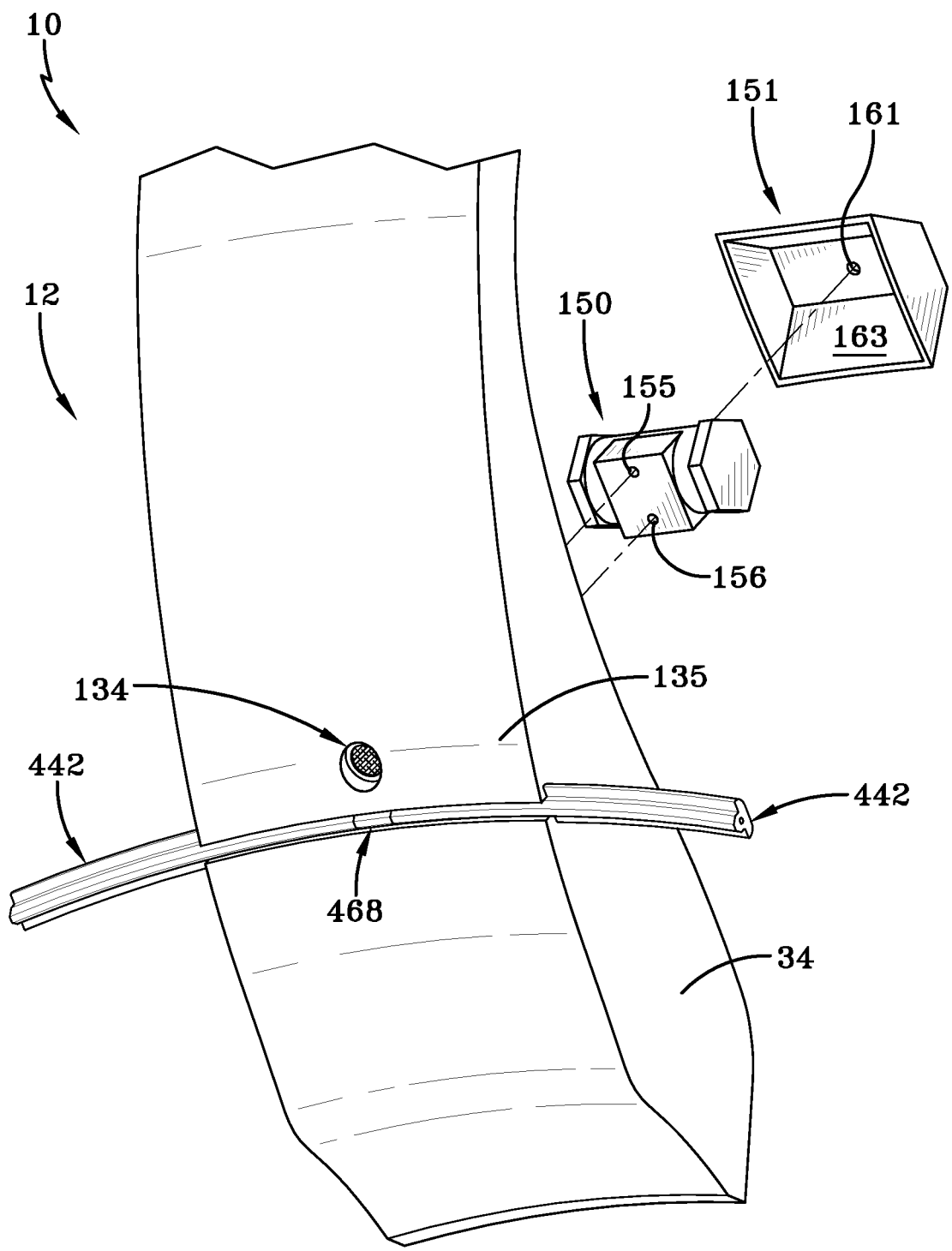
FIG. 22B; Schematic perspective exploded view of the example inlet area of FIG. 22A with the example regulator of FIGS. 7A & 7B and the example regulator protection device of FIGS. 8A & 8B.
Figure 22C:
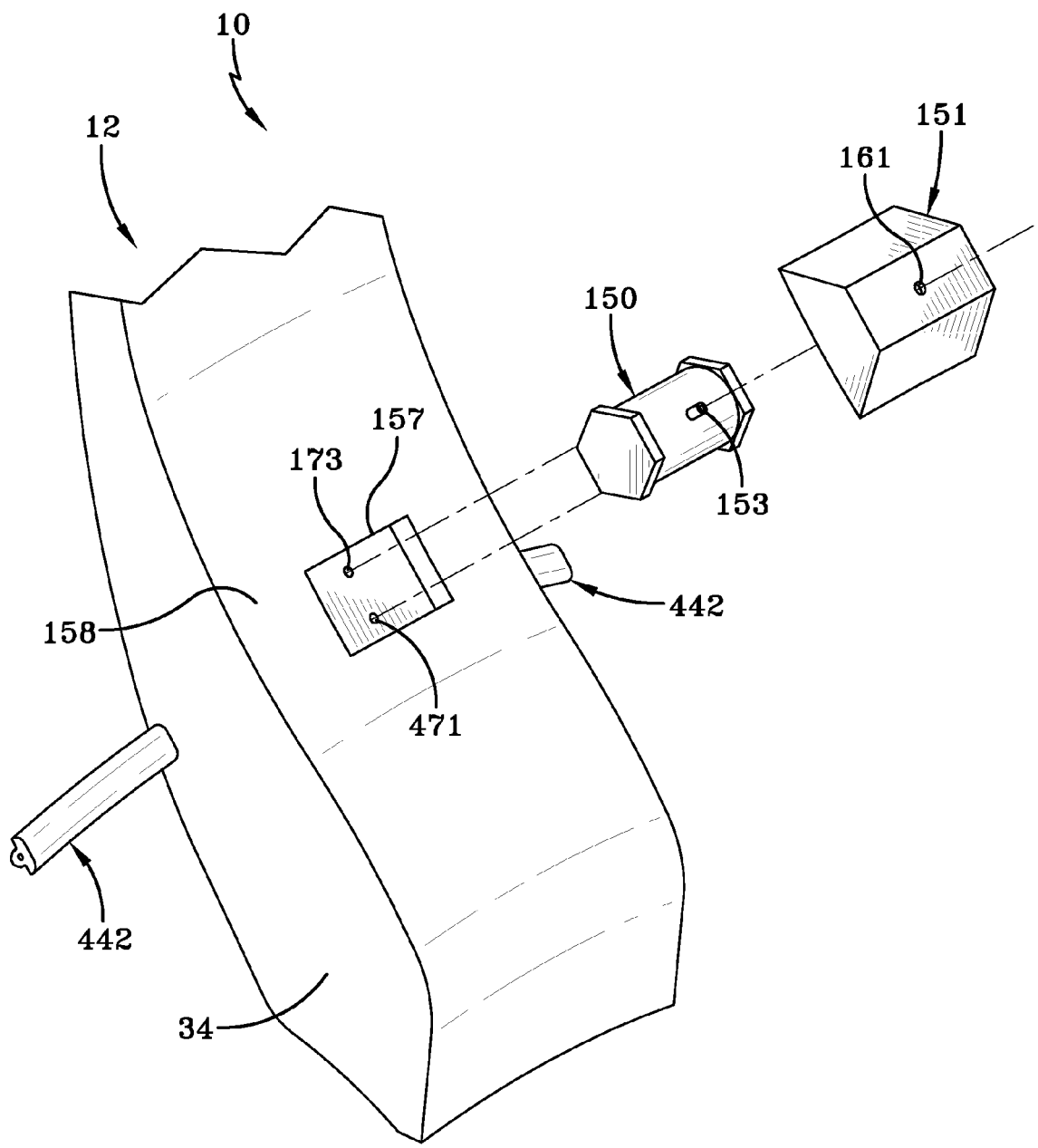
FIG. 22C; Schematic perspective exploded view of the example inlet area of FIG. 22A viewed from internal to the tire in accordance with the present invention.
Figure 22D:
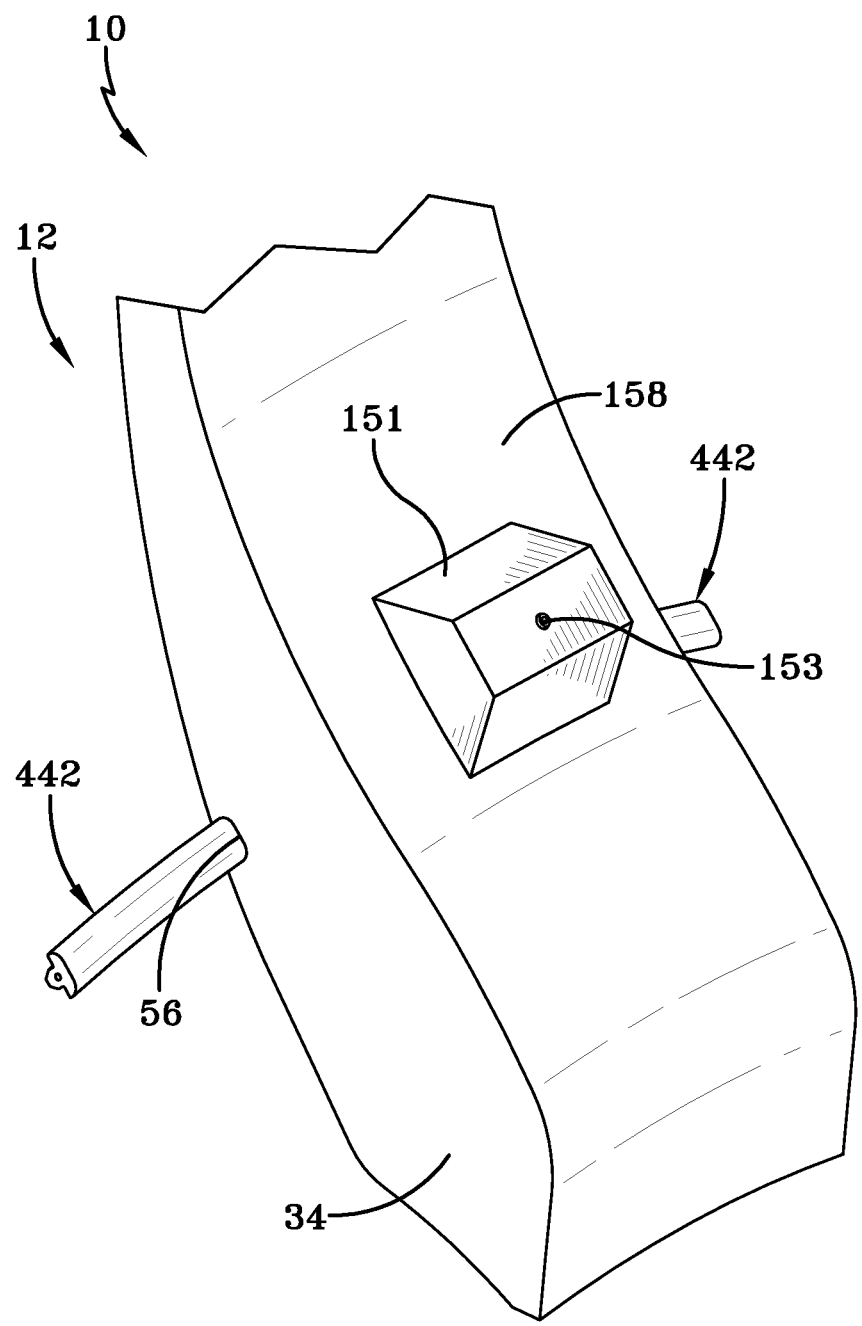
FIG. 22D; Schematic perspective assembled view of the example inlet area of FIG. 22C.

As shown in FIGS. 16A, 16B & 16C, the example tube 342 may be profiled and geometrically configured for insertion into the T-shaped groove 56. The example peristaltic pump assembly 314 may further include the inlet device 68 (FIG. 4A) and the outlet device 70 (FIG. 6A)/filter device 168 (FIG. 5A) spaced apart spaced apart the length of a similarly T-shaped spacer 371 within the groove 56.

As described above, the pressure regulator 150 and protective housing 151 may be assembled in a post-cure process of the pneumatic tire 12. This assembly 150, 151, 157 thus may protect the pressure regulator 150, the conduits 71, 72, 173, and the retreading bladder (not shown) during a retreading operation (FIG. 16C). This peristaltic pump assembly 314 may also be utilized with the alternative deeper recess 259 and sheet covering 251 described above.

Referring to FIGS. 17-23B, another example peristaltic pump assembly 414 may include two annular 160-180 degree air tubes 442 that enclose the annular passageway 43. The example tubes 442 may be formed of a resilient, flexible material such as plastic or rubber compounds that are capable of withstanding repeated deformation cycles of a flattened condition subject to external force and, upon removal of such force, returned to an original condition generally circular in cross-section. The example tubes 442 may have a diameter sufficient to operatively pass a volume of air for purposes described herein and allowing a positioning of the tubes in an operable location within the example tire assembly 10 as will be described below.

In the example configuration shown, the tubes 442 may be an elongate, generally T-shaped in cross-section, having opposite tube connector assemblies 444, 446 extending in operation from a flat (closed) trailing tube end 448 to a radiussed (open) leading tube end 450. The tubes 442 may have a longitudinal outwardly projecting pair of locking detent ribs (not shown) of generally semi-circular cross-section with each rib extending along outward surfaces of the tubes.

As shown in FIGS. 22A, 22B, 22C, 22D, 23A & 23B, the example tubes 442 may be profiled and geometrically configured for insertion into the groove 56. The groove 56 may have an elongate, generally T-shaped configuration. The example peristaltic pump assembly 414 may further include an inlet device 468 (FIG. 20A) and an outlet device 470 (FIG. 21A)/filter device 168 (FIG. 5A) spaced apart approximately 180 degrees at respective ends of the circumferential 160-180 degree air tubes 442.

The example inlet device 468 of FIGS. 20A & 20B has a T-shaped configuration in which conduits 471, 473 (2) direct air to, and from, the tire cavity 40. The inlet device 468 may have an inlet device housing 475 from which the respective conduits 471, 473 extend. The conduits 471, 473 may have external coupling ribs 481, 483 for retaining the conduits within the open ends of the air tubes 442 in an assembled condition. The housing 475 may be formed with an external geometry complementing the groove 56. The housing 475 may thus be capable of close receipt corresponding to the groove 56 at its intended location (FIGS. 22A-22D).

Figure 23A:
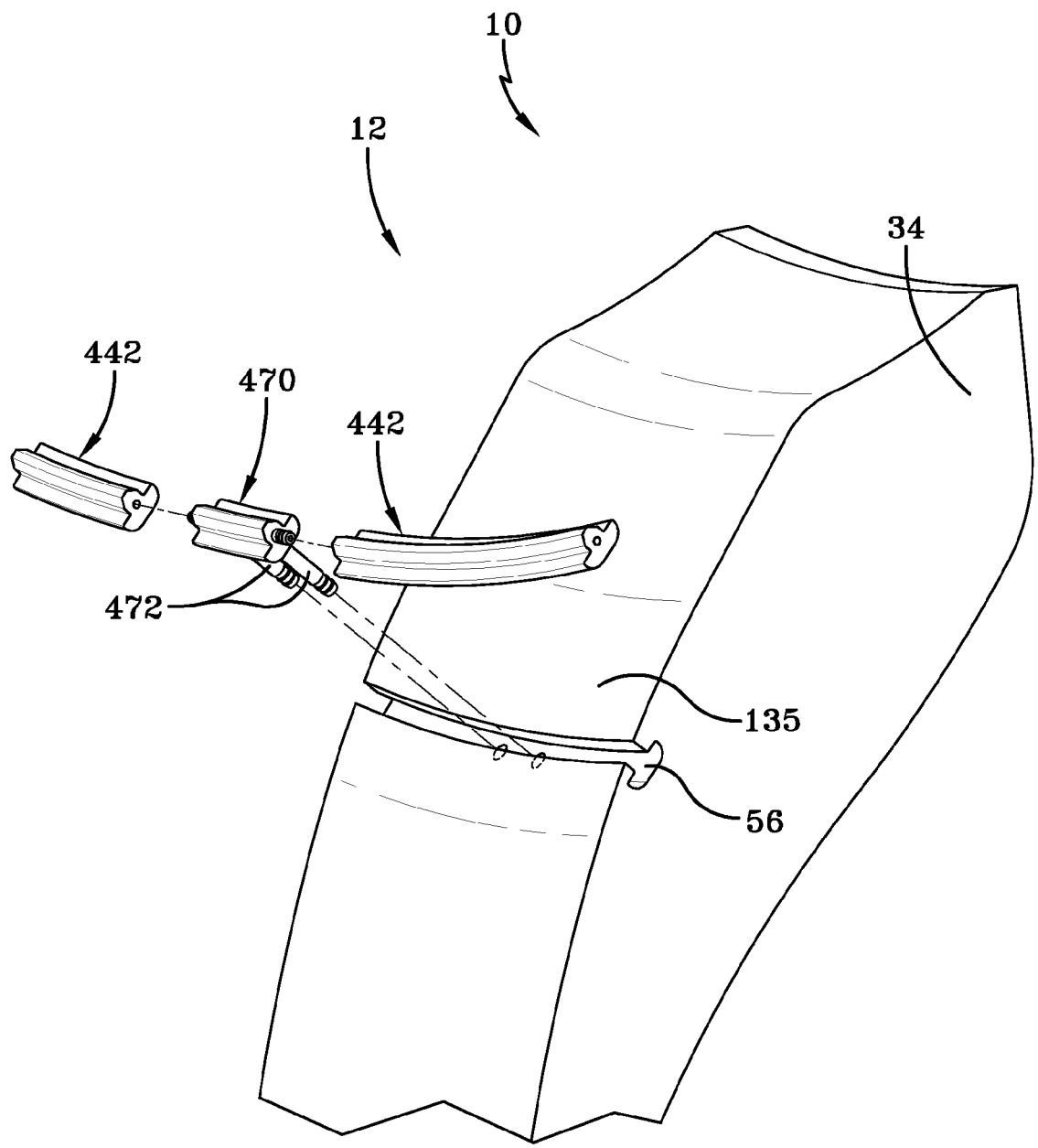
FIG. 23A; Schematic perspective exploded view of the example outlet area of FIG. 17 external to the tire in accordance FIG. 23B; Schematic perspective assembled view of the example outlet area of FIG. 23A external to the tire in accordance with the present invention.
Figure 23B:
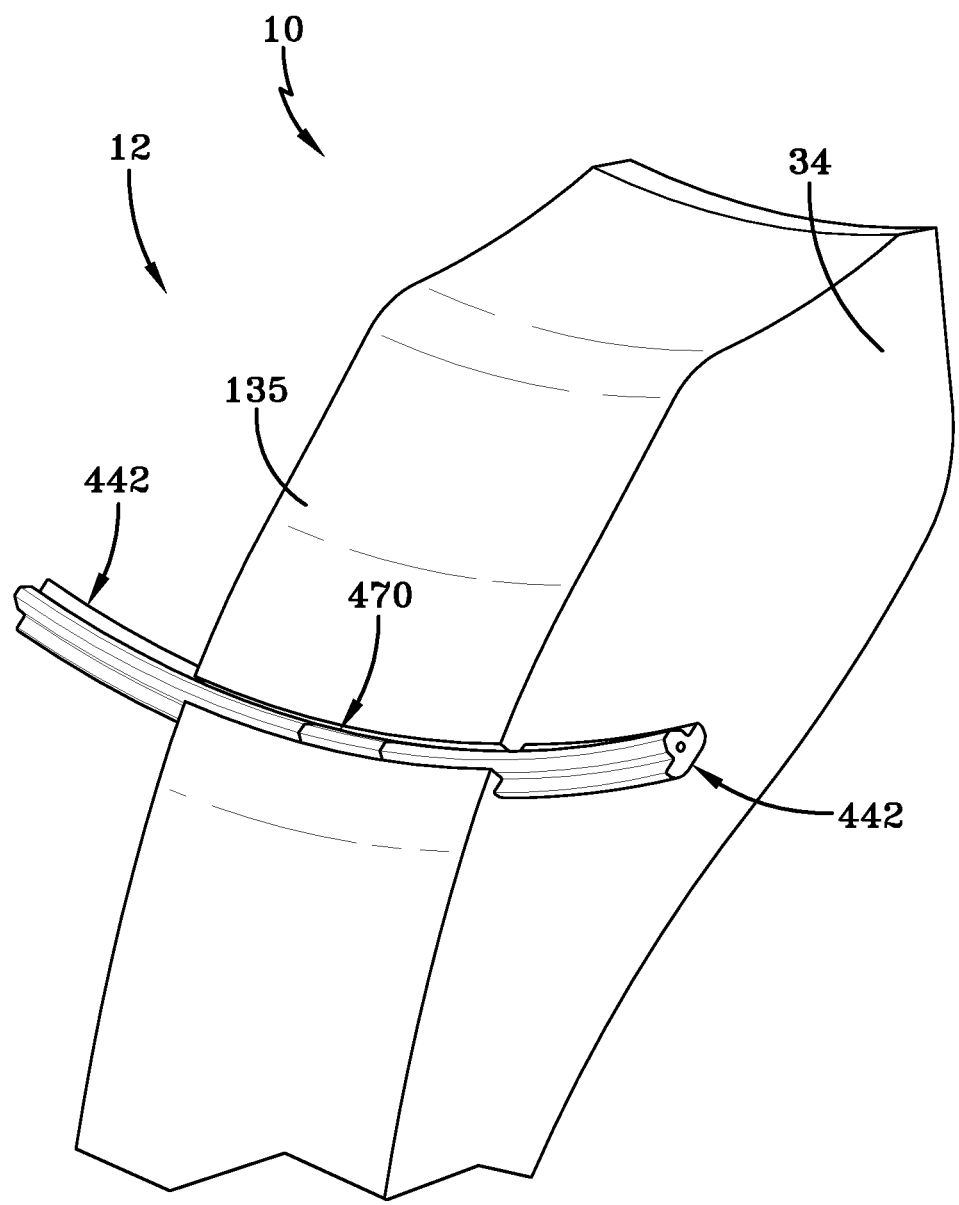

The example outlet device 470 of FIGS. 21A & 21B has a double L-shaped configuration in which conduits 472 (2), 474 (2) direct air to, and from, the tire cavity 40. The outlet device 470 may have an outlet device housing 476 from which the respective conduits 472, 474 extend. The conduits 472, 474 may have external coupling ribs 482, 484 for retaining the conduits within the open ends of the air tubes 442 in an assembled condition. The housing 476 may be formed with an external geometry complementing the groove 56. The housing 476 may thus be capable of close receipt corresponding to the groove 56 at its intended location (FIGS. 23A & 23B).

The pressure regulator 150 and protective housing 151 may be assembled in a post-cure process of the pneumatic tire 12. The housing 151 may create a tapered rectangular pocket 163 corresponding to the lugs 167 of the pressure regulator 150 and the rectangular recess 157 of the bead area 34 for securing the pressure regulator 150 to the bead area. This assembly 150, 151, 157 thus may protect the pressure regulator 150, the conduits 471, 173, and the retreading bladder (not shown) during a retreading operation (FIG. 11).

One example method of operation of the assembly 10 may be as described in U.S. Pat. No. 8,235,081 to Delgado et al., which is herein incorporated by reference. From the forgoing, it will be appreciated that the present invention comprises a bi-directionally peristaltic pump assembly 14, 314, 414 for air maintenance of a pneumatic tire 12. The peristaltic pump assembly 14, 314, 414 may pump air through rotation of the pneumatic tire 12 in either direction, one half of a revolution pumping air to the tire cavity 40 and the other half of a revolution pumping air back out of the inlet device 68, 468. The peristaltic pump assembly 14, 314, 414 may be used with a secondary tire pressure monitoring system (TPMS) (not shown) that may serve as a fault detector for the assembly 10. The TPMS may be used to detect any fault in the self-inflation system of the tire assembly 10 and alert a user of such a condition.

Variations in the present invention are possible in light of the description of it provided herein. While certain representative examples and details have been shown for the purpose of illustrating the present invention, it will be apparent to those skilled in this art that various changes and modifications may be made therein without departing from the scope of the present invention. It is, therefore, to be understood that changes may be made in the particular examples described which will be within the full intended scope of the present invention as defined by the following appended claims.

What is claimed is:

1. A tire assembly comprising:
   a tire having a pneumatic cavity;
   first and second sidewalls extending respectively from first and second tire bead regions to a tire tread region, the first sidewall having at least one bending region operatively bending when circumferentially within a rolling tire footprint;
   a sidewall groove defined by groove sidewalls positioned within the bending region of the first tire sidewall, the groove deforming segment by segment between a non-deformed state and a deformed, constricted state in response to the bending of the first sidewall bending region circumferentially within the rolling tire footprint;
   an air passageway resiliently deforming segment by segment between an expanded condition and an at least partially collapsed condition in response to respective segment by segment deformation of the sidewall groove when circumferentially within the rolling tire footprint; and
   a pressure regulator mounted to an inner surface of the pneumatic tire cavity, the pressure regulator controlling air pressure with the pneumatic tire cavity, the pressure regulator having an elongate cylindrical housing with a rectangular mounting projection.

2. The tire assembly as set forth in claim 1 wherein the rectangular mounting projection has an inlet port and an outlet port for controlling air flow from outside of the pneumatic tire to, and from, the pneumatic tire cavity.

3. The tire assembly as set forth in claim 1 wherein the cylindrical housing has a hexagonal lug for securing the pressure regulator in a recess in the inner surface of the pneumatic tire cavity.

4. The tire assembly as set forth in claim 1 further including a rectangular protective housing for securing the pressure regulator within a recess by attaching the rectangular protective housing to an inner surface of the pneumatic tire cavity.

5. The tire assembly as set forth in claim 4 wherein the cylindrical housing of the pressure regulator has a cylindrical lug for engaging a corresponding opening of the rectangular protective housing.

6. The tire assembly as set forth in claim 5 wherein the rectangular protective housing defines a tapered rectangular pocket corresponding to the cylindrical lug of the pressure regulator and a rectangular recess of the inner surface of the pneumatic tire cavity.

7. The tire assembly as set forth in claim 1 wherein a recess on an inner surface of the pneumatic tire cavity accommodates the entire pressure regulator and a protective sheet covering.

8. The tire assembly as set forth in claim 7 wherein the sheet covering secures the pressure regulator in the recess and defines a flush surface at the inner surface of the pneumatic tire cavity.

9. The tire assembly as set forth in claim 8 wherein the sheet covering has an opening for receiving a cylindrical lug of the pressure regulator.

10. A tire assembly comprising:
a tire having a pneumatic cavity;
first and second sidewalls extending respectively from first and second tire bead regions to a tire tread region, the first sidewall having at least one bending region operatively bending when circumferentially within a rolling tire footprint;
a sidewall groove defined by groove sidewalls positioned within the bending region of the first tire sidewall, the groove deforming segment by segment between a non-deformed state and a deformed, constricted state in response to the bending of the first sidewall bending region being circumferentially within the rolling tire footprint;
a pressure regulator mounted to an inner surface of the pneumatic tire cavity, the pressure regulator controlling air pressure with the pneumatic tire cavity, the pressure regulator having an elongate cylindrical housing with a rectangular mounting projection; and
an air passageway defined by the sidewall groove, the air passageway resiliently deforming segment by segment between an expanded condition and an at least partially collapsed condition in response to respective segment by segment deformation of the sidewall groove when circumferentially within the rolling tire footprint,
a first tube being secured within the sidewall groove, the first tube resiliently deforming segment by segment between an expanded condition and an at least partially collapsed condition in response to respective segment by segment deformation of the air passageway when circumferentially within the rolling tire footprint.

11. The tire assembly as set forth in claim 10 wherein the rectangular mounting projection has an inlet port and an outlet port for controlling air flow from outside of the pneumatic tire to, and from, the pneumatic tire cavity.

12. The tire assembly as set forth in claim 10 wherein the cylindrical housing has hexagonal lugs for securing the pressure regulator in a recess in the inner surface of the pneumatic tire cavity.

13. The tire assembly as set forth in claim 10 further including a rectangular protective housing for securing the pressure regulator at least partially within a recess on an inner surface of the pneumatic tire cavity.

14. The tire assembly as set forth in claim 13 wherein the cylindrical housing of the pressure regulator has a cylindrical lug for engaging a corresponding opening of the rectangular protective housing.

15. The tire assembly as set forth in claim 10 wherein a recess on an inner surface of the pneumatic tire cavity accommodates the entire pressure regulator and a protective sheet covering.

16. The tire assembly as set forth in claim 15 wherein the sheet covering secures the pressure regulator in the recess and defines a flush surface at the inner surface of the pneumatic tire cavity.

17. The tire assembly as set forth in claim 16 wherein the sheet covering has an opening for receiving a cylindrical lug of the pressure regulator.

* * * * *